United States Patent
Kim et al.

(10) Patent No.: US 11,136,520 B2
(45) Date of Patent: Oct. 5, 2021

(54) LOW-FRICTION POLYMERIZABLE COMPOSITION

(71) Applicant: LG CHEM, LTD., Seoul (KR)

(72) Inventors: Sang Woo Kim, Daejeon (KR); Seunghee Lee, Daejeon (KR); Kiho Ahn, Daejeon (KR); Yulliana Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 116 days.

(21) Appl. No.: 16/470,505

(22) PCT Filed: May 14, 2018

(86) PCT No.: PCT/KR2018/005508
§ 371 (c)(1),
(2) Date: Jun. 17, 2019

(87) PCT Pub. No.: WO2018/212533
PCT Pub. Date: Nov. 22, 2018

(65) Prior Publication Data
US 2020/0087592 A1 Mar. 19, 2020

(30) Foreign Application Priority Data

May 18, 2017 (KR) .................. 10-2017-0061797
May 11, 2018 (KR) .................. 10-2018-0054368

(51) Int. Cl.
*C10M 107/50* (2006.01)
*C08G 73/02* (2006.01)
(Continued)

(52) U.S. Cl.
CPC ......... *C10M 107/50* (2013.01); *C08G 73/024* (2013.01); *C08G 73/026* (2013.01);
(Continued)

(58) Field of Classification Search
CPC .............. C10M 107/50; C10M 107/44; C10M 103/02; C10M 107/38; C10M 103/06;
(Continued)

(56) References Cited

U.S. PATENT DOCUMENTS 4,244,857 A * 1/1981 Serafini ................ C07D 209/48
523/468
4,408,035 A 10/1983 Keller
(Continued)

FOREIGN PATENT DOCUMENTS

| CN | 103881309 A | 6/2014 |
| CN | 109071805 A | 12/2018 |

(Continued)

OTHER PUBLICATIONS

Derradji, et al.: "Mechanical and thermal properties of phthalonitrile resin reinforced with Silicon Carbide particles" XP055612782, Materials and Design, Elsevier Science Publishers B.V, vol. 71, Feb. 7, 2015, pp. 48-55.
(Continued)

*Primary Examiner* — Vishal V Vasisth
(74) *Attorney, Agent, or Firm* — Dentons US LLP

(57) ABSTRACT

The present invention relates to a low friction polymerizable composition, a prepolymer thereof, and a friction component material prepared using the same, and the low friction polymerizable composition according to the present invention includes a curing agent and a filler together with a phthalonitrile compound, and thus has an excellent low friction property as well as high heat resistance and excellent processability.

14 Claims, 11 Drawing Sheets

(51) Int. Cl.
*C08G 77/452* (2006.01)
*C10M 103/02* (2006.01)
*C10M 103/06* (2006.01)
*C10M 107/38* (2006.01)
*C10M 107/44* (2006.01)
*C10M 107/46* (2006.01)
*C10M 111/04* (2006.01)
*C08G 77/00* (2006.01)
*C10N 40/02* (2006.01)

(52) U.S. Cl.
CPC ..... *C08G 73/0253* (2013.01); *C08G 73/0273* (2013.01); *C08G 77/452* (2013.01); *C10M 103/02* (2013.01); *C10M 103/06* (2013.01); *C10M 107/38* (2013.01); *C10M 107/44* (2013.01); *C10M 107/46* (2013.01); *C10M 111/04* (2013.01); C08G 77/70 (2013.01); C10M 2201/0413 (2013.01); C10M 2201/0663 (2013.01); C10M 2213/0623 (2013.01); C10M 2217/0465 (2013.01); C10M 2221/0405 (2013.01); C10M 2229/0535 (2013.01); C10N 2040/02 (2013.01)

(58) Field of Classification Search
CPC ............... C10M 111/04; C10M 107/46; C08G 73/0253; C08G 73/026; C08G 73/0273; C08G 73/024; C08G 77/452; C08G 77/70; C08K 3/013
See application file for complete search history.

(56) References Cited

U.S. PATENT DOCUMENTS

| | | | |
|---|---|---|---|
| 4,894,286 A * | 1/1990 | Gray | C04B 41/87 428/408 |
| 5,003,039 A | 3/1991 | Keller | |
| 5,003,078 A | 3/1991 | Keller | |
| 5,004,801 A | 4/1991 | Keller et al. | |
| 5,132,396 A | 7/1992 | Keller | |
| 5,139,054 A | 8/1992 | Long et al. | |
| 5,208,318 A | 5/1993 | Keller | |
| 5,237,045 A | 8/1993 | Burchill et al. | |
| 5,292,854 A | 3/1994 | Keller | |
| 5,350,828 A | 9/1994 | Keller et al. | |
| 2003/0092907 A1 | 5/2003 | Snow et al. | |
| 2006/0194944 A1 | 8/2006 | Fowler et al. | |
| 2008/0281030 A1 | 11/2008 | Conroy et al. | |
| 2010/0029826 A1 | 2/2010 | Krizan | |
| 2015/0267022 A1 | 9/2015 | Hu et al. | |
| 2018/0194895 A1 | 7/2018 | Ahn et al. | |
| 2018/0346646 A1* | 12/2018 | Kim | C08G 73/1007 |
| 2020/0080610 A1 | 3/2020 | Kim et al. | |
| 2020/0325286 A1 | 10/2020 | Lee et al. | |

FOREIGN PATENT DOCUMENTS

| | | | |
|---|---|---|---|
| CN | 110214237 A | | 9/2019 |
| EP | 3211023 A1 | | 8/2017 |
| EP | 3424982 A1 | | 1/2019 |
| JP | 63-199228 A | | 8/1988 |
| JP | 2005-507011 A | | 3/2005 |
| JP | 2008-530309 A | | 8/2008 |
| KR | 10-1995-0011549 A | | 5/1995 |
| KR | 10-2011-0030707 A | | 3/2011 |
| KR | 10-2016-0115543 A | | 10/2016 |
| KR | 10-2017-0004256 A | | 1/2017 |
| KR | 10-2017-0065954 A | | 6/2017 |
| WO | 2016064298 A1 | | 4/2016 |
| WO | 2016100259 A1 | | 6/2016 |
| WO | 2018080088 A1 | | 5/2018 |
| WO | 2018/216986 A1 | | 11/2018 |

OTHER PUBLICATIONS

Dzhevakov. 2016.Synthesis and polymerization of disiloxane Si-O-Si-linked phthalonitrile monomer.Mendeleev Commun. vol. 26. pp. 527-529.

Dzhevakov, et al., "Synthesis and polymerization of disiloxane Si-O-Si-linked phthalonitrile monomer", Mendeleev Communications, Nov.-Dec. 2016, vol. 26, No. 6, pp. 527-529.

* cited by examiner

[FIG. 1]
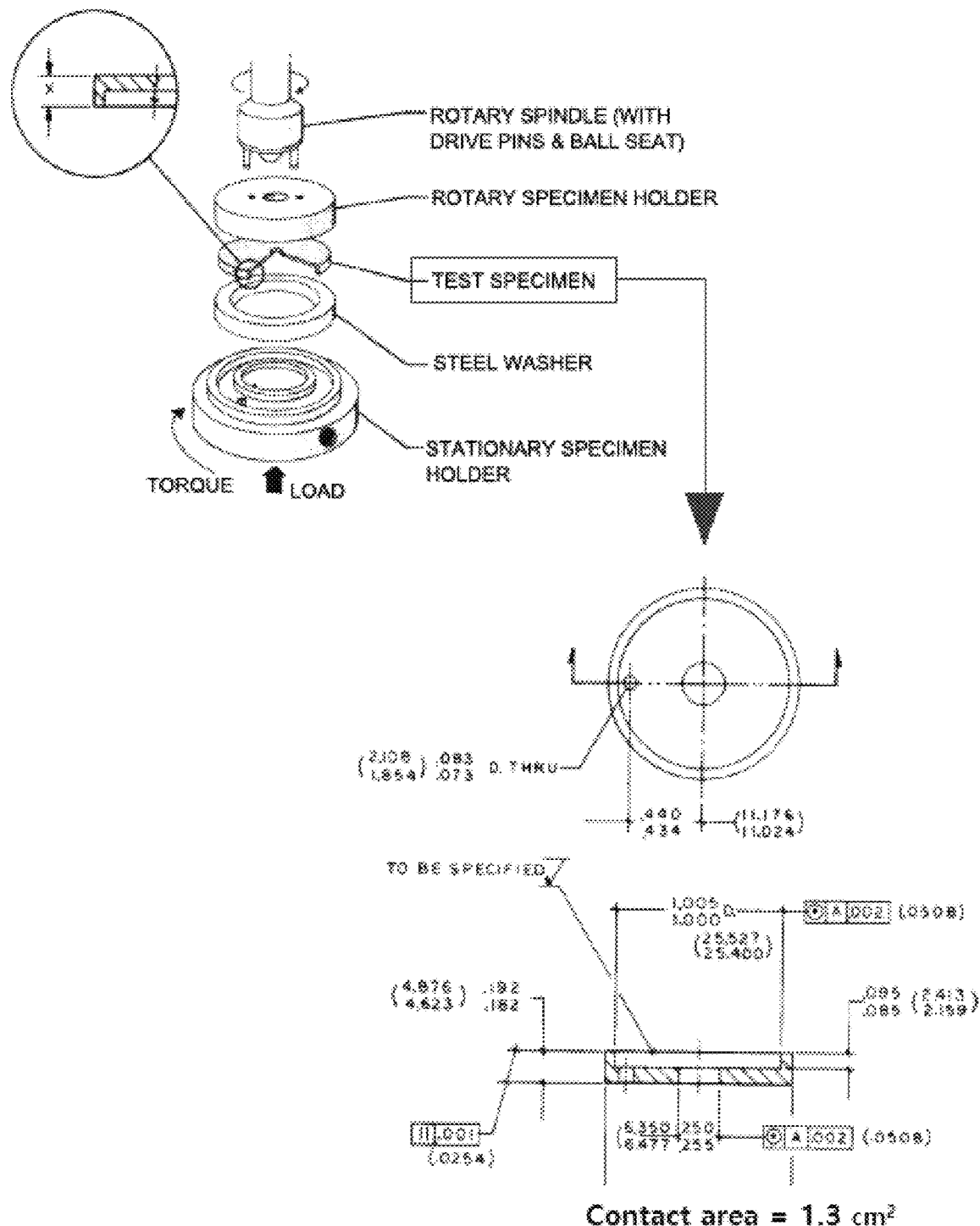

[FIG. 2]
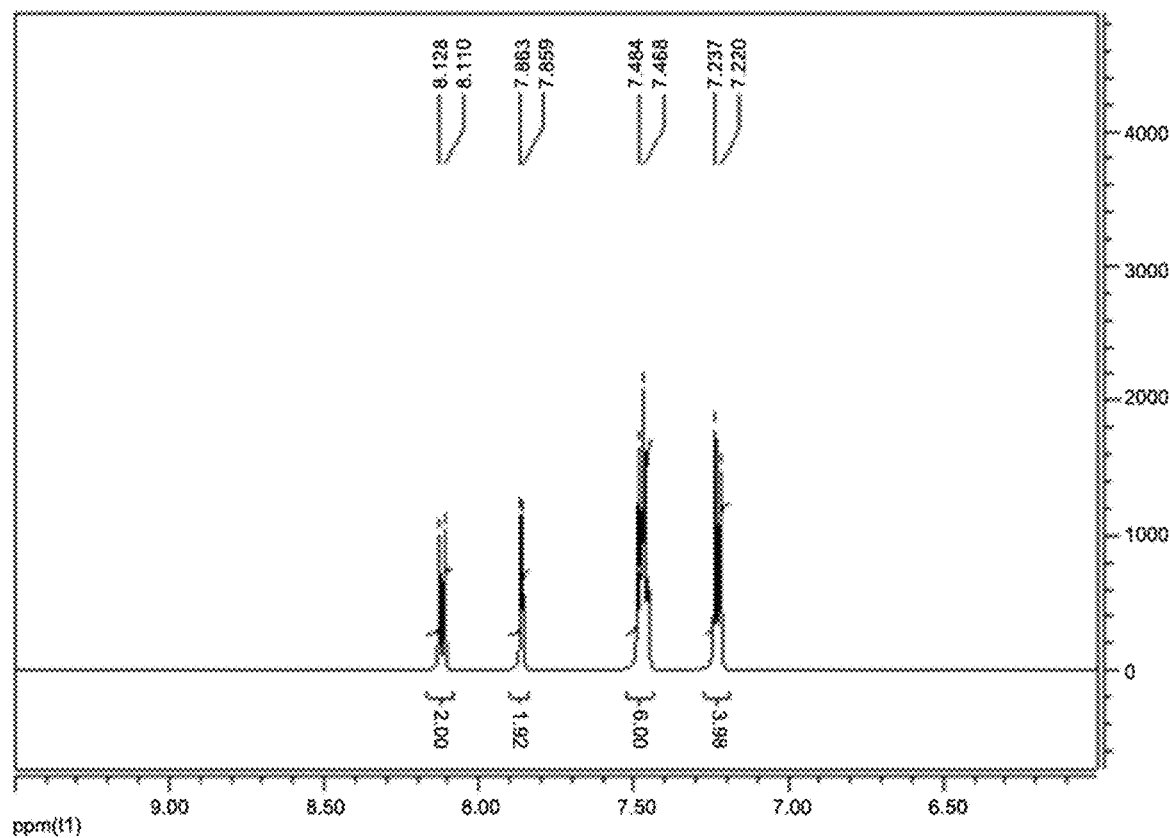

[FIG. 3]
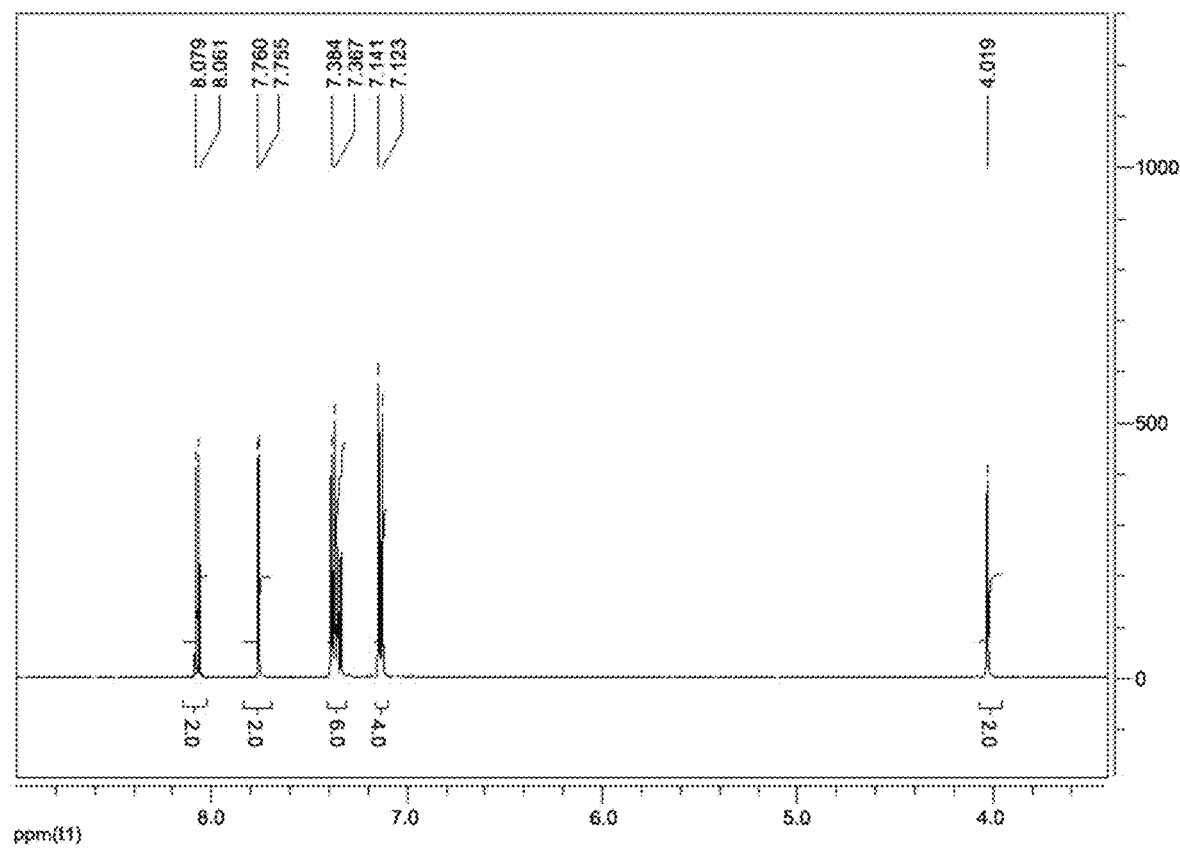

[FIG. 4]
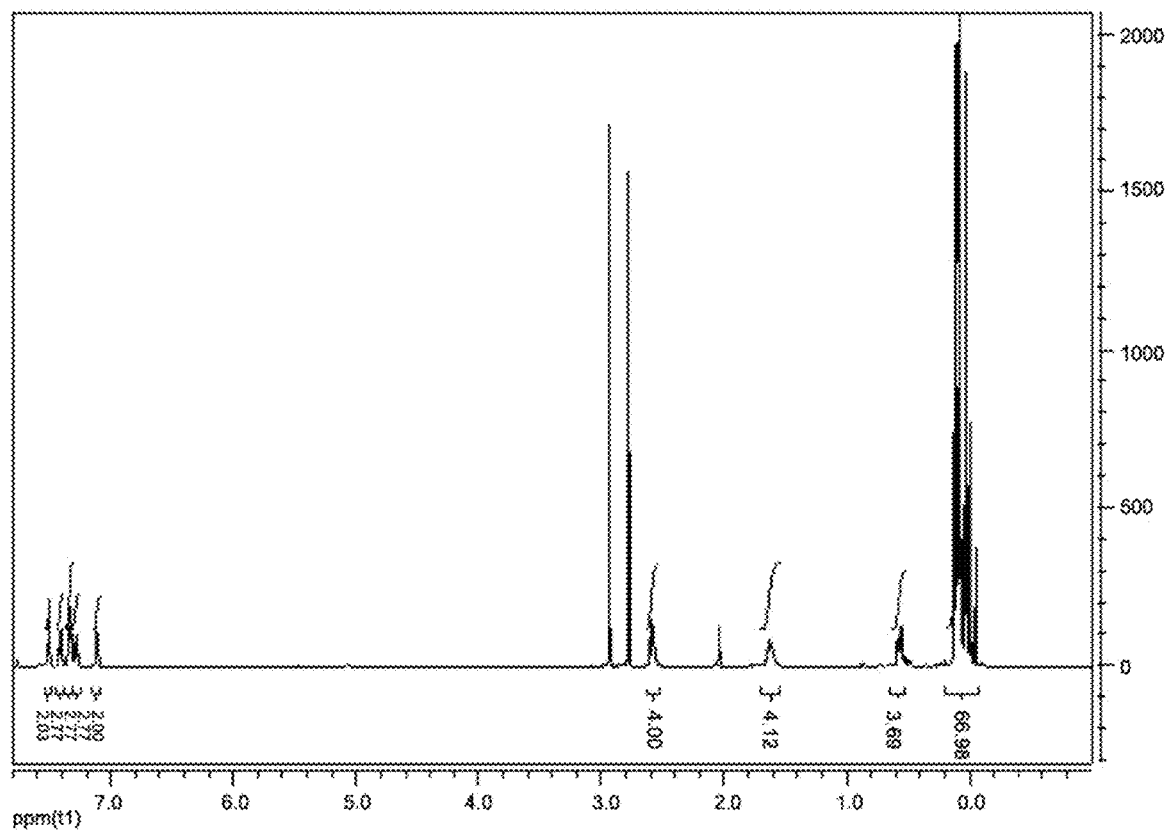

[FIG. 5]
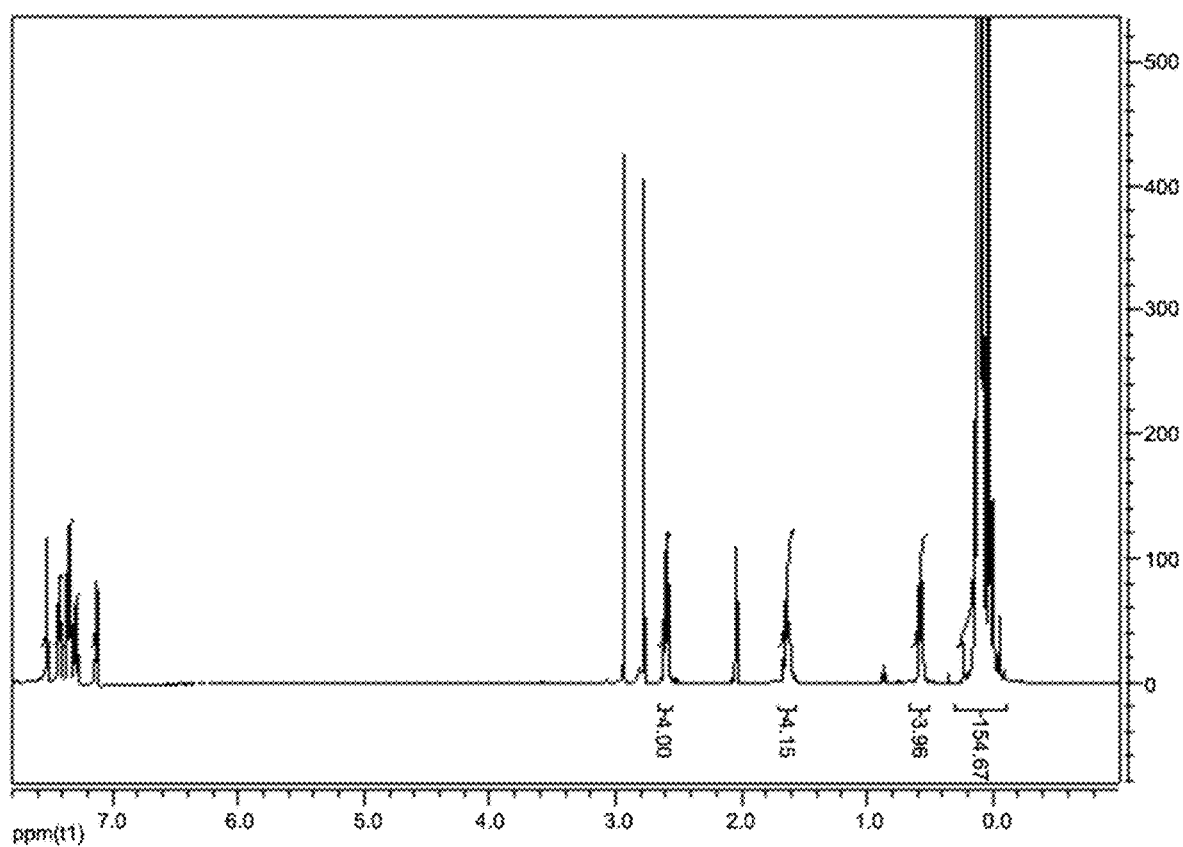

[FIG. 6]
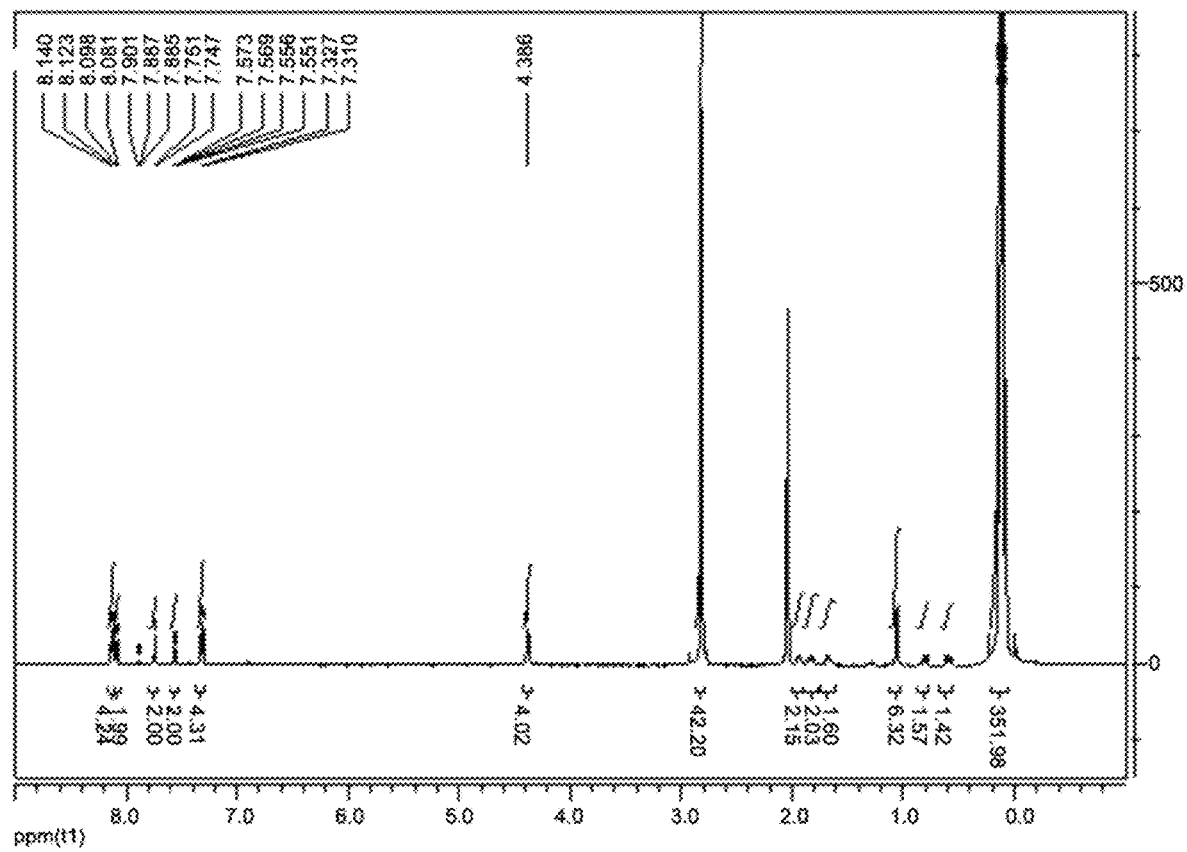

[FIG. 7]
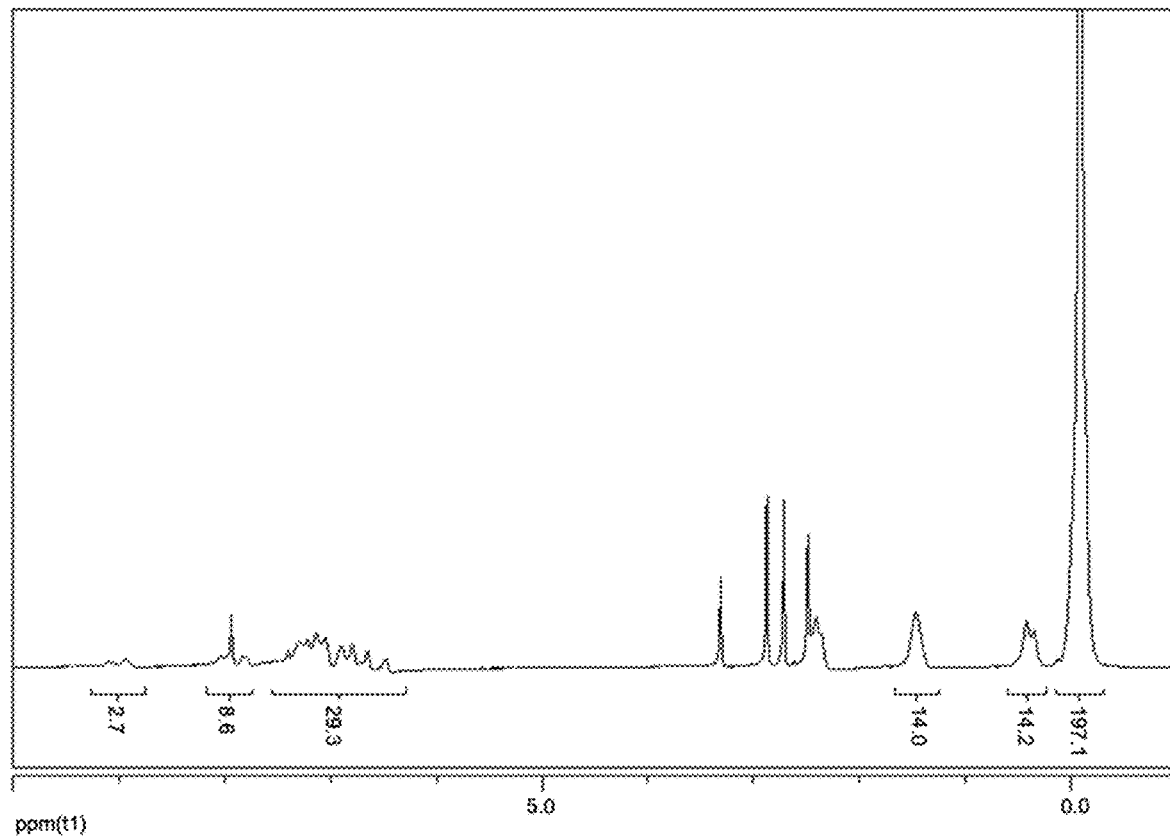

[FIG. 8]
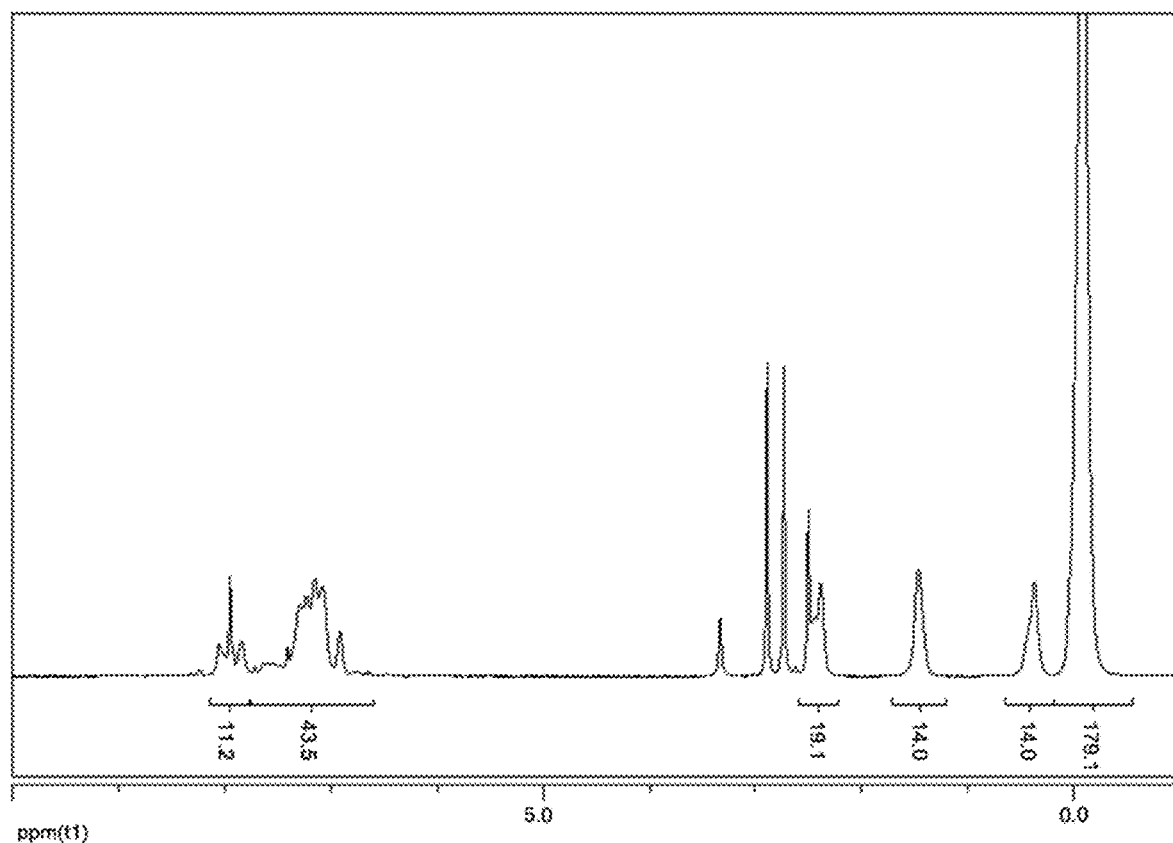

[FIG. 9]
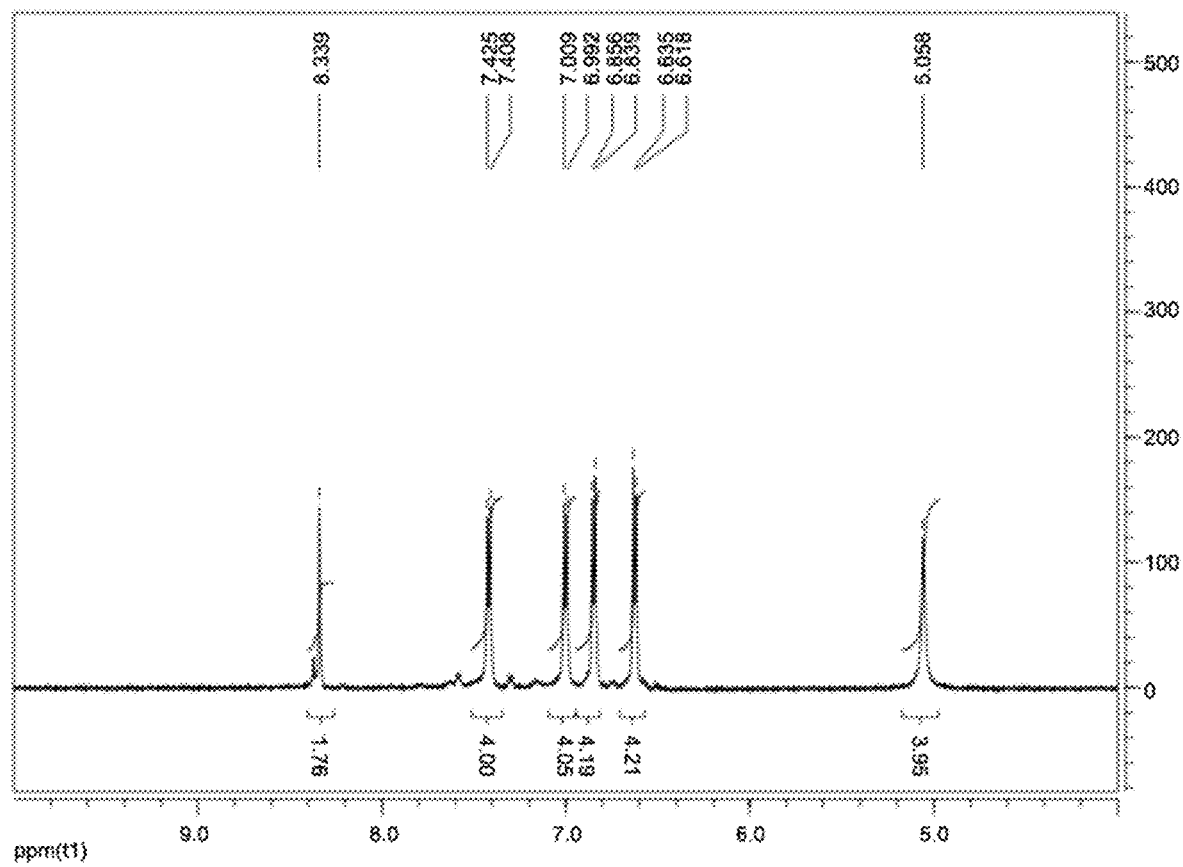

[FIG. 10]
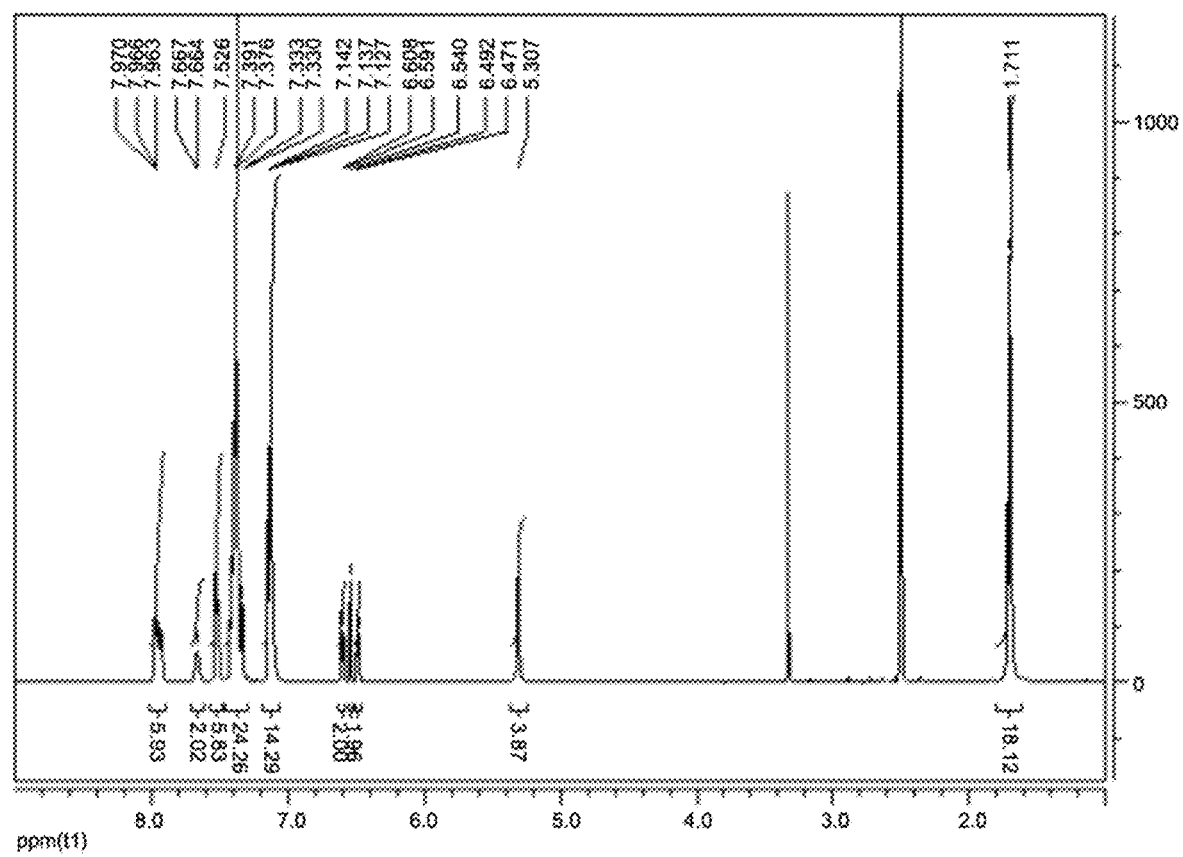

[FIG. 11]
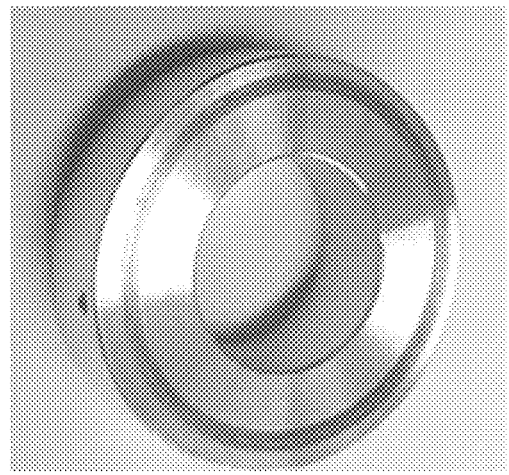
Example 1
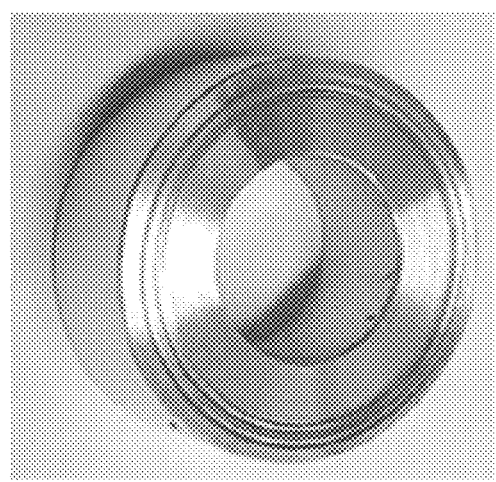
Comparative Example 1
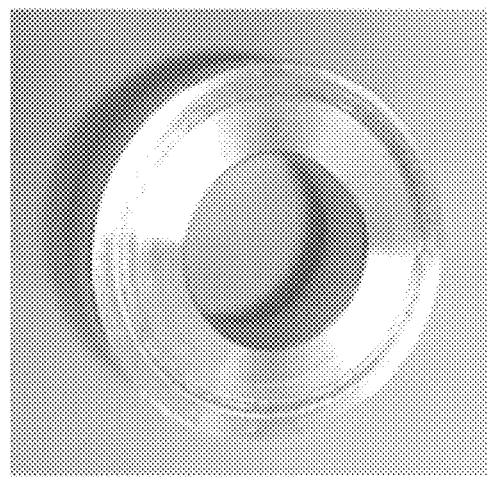
Comparative Example 2

LOW-FRICTION POLYMERIZABLE COMPOSITION

The present application is a National Phase entry pursuant to 35 U.S.C. § 371 of PCT/KR2018/005508 filed on May 14, 2018, and claims priority to and the benefit of Korean Patent Application No. 10-2017-0061797 filed on May 18, 2017 and Korean Patent Application No. 10-2018-0054368 filed on May 11, 2018 with the Korean Intellectual Property Office, the disclosures of which are incorporated herein by reference in their entirety.

FIELD

The present invention relates to a polymerizable composition that not only has a low friction property but also has excellent heat resistance, a prepolymer thereof, and a friction component material using the same.

BACKGROUND

In the automobile industry, in order to increase energy efficiency, along with reduced weight, many efforts are being made to reduce friction at energy transfer parts such as a power train, a drive train, etc. This is because only 15% of the energy of fuel used in automobiles is transferred to the wheels, and 10% thereof is lost due to friction of driving parts.

Thus, in order to reduce the friction of driving parts, plastic materials are being used in addition to metal products. Since a friction-producing component prepared from a plastic material has a self-lubricating property, it significantly contributes to the reduction of loss due to friction. However, under an environment generating high rotation speeds and pressure, the friction-producing component made of the plastic material may be deformed or fused due to frictional heat.

Thus, high heat resistant super engineering plastics such as PEEK (polyether ether ketone), PAI (polyamide imide), PI (polyimide), etc., having high heat resistance and exhibiting a low friction property, are mainly used for friction-producing components such as bearings, bushings, thrust washers, oil seals, etc. However, PEEK is still inappropriate as a component exposed to an ultra-high pressure and ultra-high velocity environment due to relatively low heat resistance, and PAI and PI are limited in terms of the application as components due to low processability and productivity, and high cost.

Therefore, the present inventors confirmed that when a low friction polymerizable composition including a phthalonitrile resin that has high heat resistance and excellent processability, and simultaneously exhibits a low friction property, is prepared, a friction component material having durability and reliability, even under an ultra-high pressure and ultra-high velocity environment, can be prepared, and completed the present invention.

SUMMARY

It is an object of the present invention to provide a low friction polymerizable composition that has high heat resistance and excellent processability, and simultaneously exhibits a low friction property.

It is another object of the present invention to provide a prepolymer, which is a reaction product of the low friction polymerizable composition.

It is another object of the present invention to provide a friction component material prepared using the prepolymer.

BRIEF DESCRIPTION OF THE DRAWINGS

FIG. 1 is an exploded perspective view of the coefficient of friction measuring apparatus for measuring a coefficient of friction according to ASTM D3702.

FIGS. 2 to 10 show the $^1$H-NMR data of the compounds prepared in Preparation Examples 1 to 9, respectively.

FIG. 11 shows, from the top, photographs of subject materials (aluminum alloy) after evaluating coefficients of friction of the test specimens according to Example 1, Comparative Example 1, and Comparative Example 2, respectively.

DETAILED DESCRIPTION

According to the present invention, a low friction polymerizable composition is provided that includes:
100 parts by weight of a phthalonitrile compound;
0.02 to 1.5 moles of a curing agent, based on 1 mole of the phthalonitrile compound; and
5 to 100 parts by weight of a filler.

Hereinafter, as used herein, the term "low friction polymerizable composition" means a composition that exhibits a low friction property, and can be prepared into a phthalonitrile resin by a polymerization reaction of a phthalonitrile compound by a curing agent included therein.

Such phthalonitrile resin includes one or more phthalonitrile substituents in a molecule, thus exhibiting an appropriate process temperature and a wide process window, as well as an excellent thermal property. That is, the phthalonitrile resin has high heat resistance, and simultaneously has excellent processability, and thus can be easily mixed with other additives, thus easily preparing a composite with excellent properties.

Thus, a polymerizable composition of the present invention is a composition that realizes a low friction property by mixing a phthalonitrile compound capable of preparing a phthalonitrile resin having high heat resistance and excellent processability, a curing agent thereof, and an appropriate amount of filler capable of increasing abrasion resistance. The present invention may further include using such a composition, such that a friction component material having durability and reliability, even in an ultra-high pressure and ultra-high velocity environment, can be prepared.

Hereinafter, the present invention will be explained in more detail.

I. Low Friction Polymerizable Composition

A low friction polymerizable composition according to the present invention includes 100 parts by weight of a phthalonitrile compound, 0.02 to 1.5 moles of a curing agent based on 1 mole of the phthalonitrile compound, and 5 to 100 parts by weight of a filler.

(1) Phthalonitrile Compound

A phthalonitrile compound that can be used in the polymerizable composition may be a compound including 2 or more, 2 to 20, 2 to 16, 2 to 12, 2 to 8, or 2 to 4 phthalonitrile structures capable of forming a phthalonitrile resin through reaction with the curing agent.

Preferably, the phthalonitrile compound may be a compound represented by the average compositional formula of the following Chemical Formula 1:

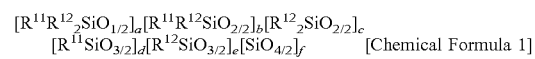

[Chemical Formula 1]

wherein, in Chemical Formula 1, each $R^{11}$ is independently a substituent of the following Chemical Formula 2, each $R^{12}$ is independently hydrogen, or an alkyl, alkenyl, alkynyl, alkoxy, or aryl group, each of a, b, and c is a positive number, each of d, e, and f is 0 or a positive number, and a+b+c+d+e+f is 1;

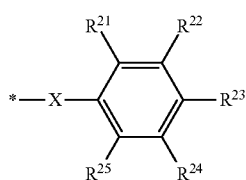

[Chemical Formula 2]

wherein, in Chemical Formula 2,

X is a group connected to the silicon atom of Chemical Formula 1, and is a single bond, an oxygen atom, a sulfur atom, $-S(=O)_2-$, a carbonyl group, an alkylene group, an alkenylene group, an alkynylene group, $-C(=O)-X^1-$, or $-X^1-C(=O)-$, and $X^1$ is an oxygen atom, a sulfur atom, $-S(=O)_2-$, an alkylene group, an alkenylene group, or an alkynylene group, each of $R^{21}$ to $R^{25}$ is independently hydrogen, an alkyl group, an alkoxy group, a hydroxyl group, a cyano group, or a substituent of the following Chemical Formula 3, and at least one of $R^{21}$ to $R^{25}$ is a substituent of the following Chemical Formula 3;

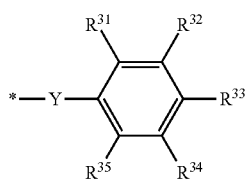

[Chemical Formula 3]

wherein, in Chemical Formula 3,

Y is a single bond, an oxygen atom, a sulfur atom, $-S(=O)_2-$, a carbonyl group, an alkylene group, an alkenylene group, an alkynylene group, $-C(=O)-X^1-$, or $-X^1-C(=O)-$, and $X^1$ is an oxygen atom, a sulfur atom, $-S(=O)_2-$, an alkylene group, an alkenylene group, or an alkynylene group, each of $R^{31}$ to $R^{35}$ is independently hydrogen, an alkyl group, an alkoxy group, a hydroxyl group, or a cyano group, and two or more of $R^{31}$ to $R^{35}$ are cyano groups.

Throughout the specification, the description that a compound is represented by a specific average compositional formula means that the compound is a single compound represented by the compositional formula. Further, the description that a compound is represented by a specific average compositional formula means that the compound is a mixture of two or more different compounds, and that the compound has the average composition of the mixture and is represented by the compositional formula.

A compound represented by the average compositional formula of Chemical Formula 1 may be a compound in the form of a polymer or oligomer, and for example, the weight average molecular weight (Mw) may be in a range of 1,000 to 50,000 g/mol, 2,500 to 35,000 g/mol, 4,000 to 20,000 g/mol, or 6,000 to 9,000 g/mol.

A compound represented by the average compositional formula of Chemical Formula 1 has a weight average molecular weight of the above range, thus enabling the preparation of a polymerizable composition having a low process temperature and/or a wide process window.

Throughout the specification, the term 'weight average molecular weight' is a numerical value converted in terms of standard polystyrene, measured by GPC (Gel Permeation Chromatograph), and the term 'molecular weight' means weight average molecular weight unless otherwise described.

A compound represented by the average compositional formula of Chemical Formula 1 may be a compound represented by the average compositional formula of the following Chemical Formula 4:

[Chemical Formula 4]

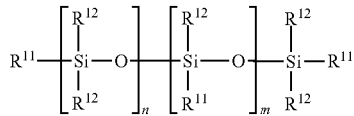

wherein, in Chemical Formula 4, $R^{11}$ and $R^{12}$ are as defined in Chemical Formula 1, and n and m are numbers respectively selected in the range of 1 to 100, and fulfilling $2 \leq n+m \leq 100$.

Preferably, in Chemical Formula 4, n+m is 2 to 100, 2 to 80, or 2 to 50. A compound fulfilling the range of n+m enables the preparation of a polymerizable composition having excellent processability.

Further, preferably, the phthalonitrile compound may be a compound represented by the average compositional formula of the following Chemical Formula 5:

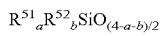

$R^{51}{}_a R^{52}{}_b SiO_{(4-a-b)/2}$      [Chemical Formula 5]

wherein, in Chemical Formula 5, $R^{51}$ is a substituent of the following Chemical Formula 6, each $R^{52}$ is independently hydrogen, an alkyl group, an alkenyl group, an alkynyl group, an alkoxy group, or an aryl group, a is a number in the range of 0.01 to 0.4, and b is a number in the range of 0.5 to 4;

[Chemical Formula 6]

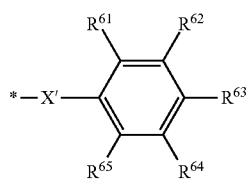

wherein, in Chemical Formula 6,

X' is a group connected to the silicon atom of Chemical Formula 5, and is a single bond, an oxygen atom, a sulfur atom, $-S(=O)_2-$, a carbonyl group, an alkylene group, an alkenylene group, an alkynylene group, $-C(=O)-X^1-$, or $-X^1-C(=O)-$, and $X^1$ is an oxygen atom, a sulfur atom, $-S(=O)_2-$, an alkylene group, an alkenylene group, or an alkynylene group, each of $R^{61}$ to $R^{65}$ is independently hydrogen, an alkyl group, an alkoxy group, a hydroxyl group, a cyano group, or a substituent of the following Chemical Formula 7, and at least one of $R^{61}$ to $R^{65}$ is a substituent of the following Chemical Formula 7;

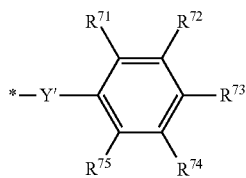

[Chemical Formula 7]

wherein, in Chemical Formula 7,

Y' is a single bond, an oxygen atom, a sulfur atom, $-S(=O)_2-$, a carbonyl group, an alkylene group, an alkenylene group, an alkynylene group, $-C(=O)-X^1-$, or $-X^1-C(=O)-$, and $X^1$ is an oxygen atom, a sulfur atom, $-S(=O)_2-$, an alkylene group, an alkenylene group, or an alkynylene group, and each of $R^{71}$ to $R^{75}$ is independently hydrogen, an alkyl group, an alkoxy group, a hydroxyl group, or a cyano group, and two or more of $R^{71}$ to $R^{75}$ are cyano groups.

A compound represented by the average compositional formula of Chemical Formula 7 may be a compound in the form of a polymer or oligomer, and for example, the weight average molecular weight (Mw) may be in the range of 700 to 7,000 g/mol, 700 to 6,500 g/mol, 700 to 5,800 g/mol, or 700 to 5,000 g/mol.

A compound represented by the average compositional formula of Chemical Formula 7 has a weight average molecular weight of the above range, thus enabling the preparation of a polymerizable composition having a low process temperature and/or a wide process window.

A compound represented by the average compositional formula of Chemical Formula 7 may be a compound represented by the following Chemical Formula 8:

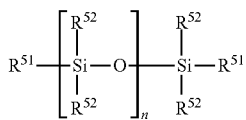

[Chemical Formula 8]

wherein, in Chemical Formula 8, $R^{51}$ and $R^{52}$ are as defined in Chemical Formula 5, and n is a number in the range of 3 to 100.

In Chemical Formula 8, n may be 5 or more or 7 or more, and 95 or less, 90 or less, 85 or less, 80 or less, 75 or less, 70 or less, 65 or less, or 60 or less.

Besides the above-explained phthalonitrile compounds, as examples of the phthalonitrile compound, compounds described in U.S. Pat. Nos. 4,408,035, 5,003,039, 5,003,078, 5,004,801, 5,132,396, 5,139,054, 5,208,318, 5,237,045, 5,292,854, 5,350,828, etc. may be mentioned, and besides those described in the documents, various compounds known in the art may be included.

(2) Curing Agent

Meanwhile, a low friction polymerizable composition includes a curing agent capable of curing a phthalonitrile compound, at a ratio of 0.02 to 1.5 moles, based on 1 mole of the phthalonitrile compound. If the curing agent is used in an amount less than 0.02 moles based on 1 mole of the phthalonitrile compound, the phthalonitrile compound may not be sufficiently cured, and thus curability may become insufficient, and if the curing agent is used in an amount greater than 1.5 moles based on 1 mole of the phthalonitrile compound, the process window of the polymerizable composition may become narrow.

A curing agent capable of curing the phthalonitrile compound is not specifically limited as long as it can react with the phthalonitrile compound to form the phthalonitrile resin. For example, as the curing agent, one or more compound selected from the group consisting of amine-based compounds, hydroxyl-based compounds, and imide-based compounds, may be used. The amine-based compound, hydroxyl-based compound, and imide-based compound, respectively, mean a compound including at least one amino group, hydroxyl group, and imide group in the molecule.

Specifically, for example, the curing agent may be an imide-based compound represented by the following Chemical Formula 9:

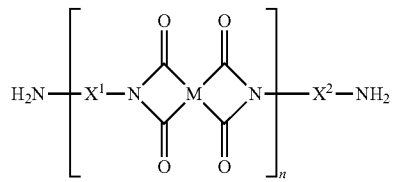

[Chemical Formula 9]

wherein, in Chemical Formula 9,

M is a tetravalent radical derived from an aliphatic, alicyclic, or aromatic compound, each of $X^1$ and $X^2$ is independently an alkylene group, an alkylidene group, or a divalent radical derived from an aromatic compound, and n is a number equal to or greater than 1.

Such an imide-based compound represented by Chemical Formula 9 exhibits excellent heat resistance because it includes an imide structure in the molecule, and thus, even if it is included in an excess amount in the polymerizable composition, or the polymerizable composition is processed or cured at a high temperature, a polymerizable composition that does not generate defects such as voids, that may have a bad influence on the properties, can be prepared.

In Chemical Formula 9, M may be a tetravalent radical derived from an aliphatic, alicyclic, or aromatic compound, and it may have a structure wherein radicals formed by dehydrogenation of 4 hydrogen atoms in a molecule of the aliphatic, alicyclic, or aromatic compound are respectively connected with the carbon atoms of the carbonyl group of Chemical Formula 9.

As the aliphatic compound, a linear or branched alkane, alkene, or alkyne may be mentioned. As the aliphatic compound, a C2-20, C2-16, C2-12, C2-8, or C2-4 alkane, alkene, or alkyne may be used. The alkane, alkene, or alkyne may be optionally substituted with one or more substituents.

As the alicyclic compound, hydrocarbon compounds including a C3-20, C3-16, C3-12, C3-8, or C3-4 non-aromatic ring structures may be mentioned. Such an alicyclic hydrocarbon compound may include at least one heteroatom such as oxygen or nitrogen as a ring member, and if necessary, it may be optionally substituted with one or more substituents.

As the aromatic compound, benzene, benzene-containing compounds, or derivatives thereof may be mentioned. The benzene-containing compounds are compounds wherein two or more benzene rings are condensed while sharing one or more carbon atoms, are directly connected, or are connected by an appropriate linker.

As the linker used to connect two benzene rings, an alkylene group, an alkylidene group, —O—, —S—, —C(=O)—, —S(=O)—, —S(=O)$_2$—, —C(=O)—O-$L^1$-O—C(=O)—, -$L^2$-C(=O)—O-$L^3$-, -$L^4$-O—C(=O)-$L^5$-, -$L^6$-$Ar^1$-$L^7$-$Ar^2$-$L^8$-, etc. may be mentioned.

Each of $L^1$ to $L^8$ may independently be a single bond, —O—, an alkylene group, or an alkylidene group, and each of $Ar^1$ and $Ar^2$ may be independently be an arylene group.

The aromatic compound may include, for example, 6 to 30, 6 to 28, 6 to 27, 6 to 25, 6 to 20, or 6 to 12 carbon atoms, and if necessary, may be substituted with one or more substituents. When the aromatic compound includes the above-explained linker, the number of carbon atoms of the aromatic compound is a number including the carbon atoms existing in the linker.

Specifically, for example, in Chemical Formula 9, M may be a tetravalent radical derived from an alkane, alkene, or alkyne, or a tetravalent radical derived from a compound represented by any one of the following Chemical Formulas 10 to 15:

[Chemical Formula 10]

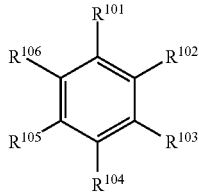

wherein, in Chemical Formula 10, each of $R^{101}$ to $R^{106}$ is independently hydrogen, an alkyl group, an alkoxy group, or an aryl group;

[Chemical Formula 11]

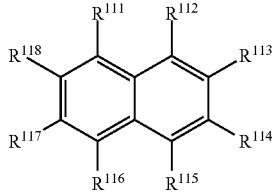

wherein, in Chemical Formula 11, each of $R^{111}$ to $R^{118}$ is independently hydrogen, an alkyl group, an alkoxy group, or an aryl group;

[Chemical Formula 12]

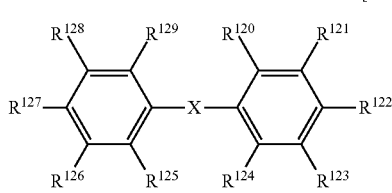

wherein, in Chemical Formula 12,
each of $R^{120}$ to $R^{129}$ is independently hydrogen, an alkyl group, an alkoxy group, or an aryl group, X is a single bond, an alkylene group, an alkylidene group, —O—, —S—, —C(=O)—, —S(=O)—, —S(=O)$_2$—, —C(=O)—O-$L^1$-O—C(=O)—, -$L^2$-C(=O)—O-$L^3$-, -$L^4$-O—C(=O)-$L^5$-, or -$L^6$-$Ar^1$-$L^7$-$Ar^2$-$L^8$-, each of $L^1$ to $L^8$ is independently a single bond, —O—, an alkylene group, or an alkylidene group, and each of $Ar^1$ and $Ar^2$ is independently an arylene group.

Here, the single bond means that an atom does not exist at that part. Thus, in Chemical Formula 12, if X is a single bond, it means that an atom does not exist at a part indicated by X, and in this case, the benzene rings of both sides of X may be directly connected to form a biphenyl structure.

Among the X in Chemical Formula 12, in —C(=O)—O-$L^1$-O—C(=O)—, -$L^2$-C(=O)—O-$L^3$-, or -$L^4$-O—C(=O)-$L^5$-, each of $L^1$ to $L^5$ may independently be a C1-12, C1-8, or C1-4 alkylene group or alkylidene group, and the alkylene group or alkylidene group may be substituted or unsubstituted.

Further, among the X in Chemical Formula 12, in -$L^6$-$Ar^1$-$L^7$-$Ar^2$-$L^8$-, $L^6$ and $L^8$ may be —O—, $L^7$ may be a C1-12, C1-8, or C1-4 alkylene group or alkylidene group, and the alkylene group or alkylidene group may be substituted or unsubstituted. $Ar^1$ and $Ar^2$ may be a phenylene group, and in this case, on the basis of $L^7$, each of $L^6$ and $L^8$ may be connected at the ortho, meta, or para position of the phenylene.

[Chemical Formula 13]

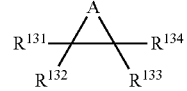

In Chemical Formula 13,
each of $R^{131}$ to $R^{134}$ is independently hydrogen, an alkyl group, or an alkoxy group, and two of $R^{131}$ to $R^{134}$ may be connected to each other to form an alkylene group, and A is an alkylene group or an alkenylene group, and the alkylene group or alkenylene group may include one or more oxygen atoms as a heteroatom;

[Chemical Formula 14]

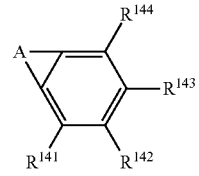

wherein, in Chemical Formula 14,
each of $R^{141}$ to $R^{144}$ is independently hydrogen, an alkyl group, or an alkoxy group, and A is an alkylene group;

[Chemical Formula 15]

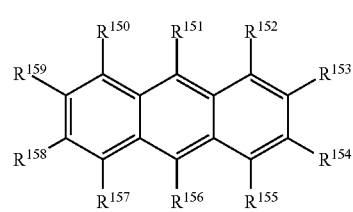

wherein, in Chemical Formula 15, each of $R^{150}$ to $R^{159}$ is independently hydrogen, an alkyl group, or an alkoxy group.

A tetravalent radical derived from the compound represented by any one of Chemical Formulas 10 to 15 may be formed by directly eliminating the substituents of Chemical Formula 10 to 15, or may be formed by dehydrogenation of the hydrogen atom of the alkyl group, alkoxy group, aryl group, alkylene group, or alkenylene group in the substituents.

For example, when the tetravalent radical is derived from a compound of Chemical Formula 10, one or more, two or more, three or more, or four of $R^{101}$ to $R^{106}$ of Chemical Formula 10 may form a radical, or hydrogen atoms of the alkyl group, alkoxy group, or aryl group existing in $R^{101}$ to $R^{106}$ may be eliminated to form a radical. The formation of a radical means that the part is connected to the carbon atom of the carbonyl group of Chemical Formula 9, as explained above.

In addition, when the tetravalent radical is derived from a compound of Chemical Formula 12, each of $R^{120}$ to $R^{129}$ is independently hydrogen, an alkyl group, an alkoxy group, or an aryl group, and one or more, two or more, three or more, or four of $R^{120}$ to $R^{129}$ may form a radical connected to Chemical Formula 9. Each of $R^{120}$ to $R^{129}$ that does not form a radical may be hydrogen, an alkyl group, or an alkoxy group, or may be hydrogen or an alkyl group. For example, in Chemical Formula 12, two of $R^{127}$ to $R^{129}$ and two of $R^{122}$ to $R^{124}$ may form the radical, and other substituents may independently be hydrogen, an alkyl group, an alkoxy group, or an aryl group, may be hydrogen, an alkyl group, or an alkoxy group, or may be hydrogen or an alkyl group.

More specifically, for example, a compound represented by Chemical Formula 10 may be benzene, 1,2,4,5-tetraalkylbenzene, etc., but is not limited thereto.

Further, a compound represented by Chemical Formula 12 may be biphenyl, or the compound represented by any one of the following Chemical Formulas A to F, but is not limited thereto.

[Chemical Formula A]

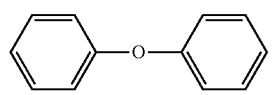

[Chemical Formula B]

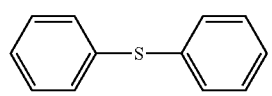

[Chemical Formula C]

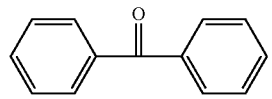

[Chemical Formula D]

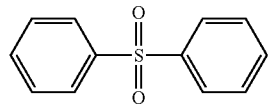

[Chemical Formula E]

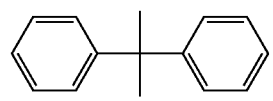

[Chemical Formula F]

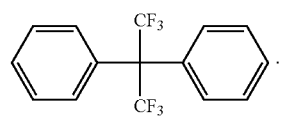

A compound represented by Chemical Formula 13 may be a C4-8 cycloalkane such as cyclohexane, etc., a C4-8 cycloalkene such as cyclohexene that may be substituted with one or more alkyl groups, etc., or a compound represented by any one of the following Chemical Formulas G to I, but is not limited thereto.

[Chemical Formula G]

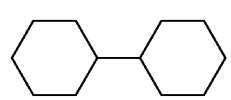

[Chemical Formula H]

[Chemical Formula I]

A compound represented by Chemical Formula 14 may be a compound represented by the following Chemical Formula J or a compound represented by the following Chemical Formula J, at least one hydrogen of which is substituted with an alkyl group, but is not limited thereto.

[Chemical Formula J]

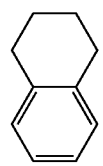

In Chemical Formula 9, each of $X^1$ and $X^2$ may independently be a divalent radical derived from an aromatic compound. For example, each of $X^1$ and $X^2$ may independently be a divalent radical derived from a C6-40 aromatic compound. The divalent radical derived from an aromatic compound may be a divalent radical derived from the above-explained aromatic compounds.

Specifically, for example, in Chemical Formula 9, each of $X^1$ and $X^2$ may independently be a divalent radical derived from the compound represented by any one of the following Chemical Formulas 16 to 18:

[Chemical Formula 16]

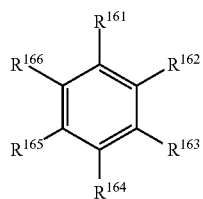

wherein, in Chemical Formula 16,
each of $R^{161}$ to $R^{166}$ is independently hydrogen, an alkyl group, an alkoxy group, an aryl group, a hydroxy group, or a carboxyl group;

[Chemical Formula 17]

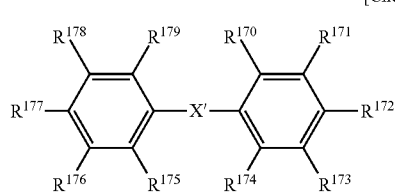

wherein, in Chemical Formula 1,
each of $R^{170}$ to $R^{179}$ is independently hydrogen, an alkyl group, an alkoxy group, an aryl group, a hydroxy group, or a carboxyl group,
X' is a single bond, an alkylene group, an alkylidene group, —O—, —S—, —C(=O)—, —NR$^a$—, —S(=O)—, —S(=O)$_2$—, -L$^9$-Ar$^3$-L$^{10}$-, or -L$^{11}$-Ar$^4$-L$^{12}$-Ar$^5$-L$^{13}$-, R$^a$ is hydrogen, an alkyl group, an alkoxy group, or an aryl group, each of L$^9$ to L$^{13}$ is independently a single bond, —O—, an alkylene group, or an alkylidene group, and each of Ar$^3$ to Ar$^5$ is independently an arylene group;

[Chemical Formula 18]

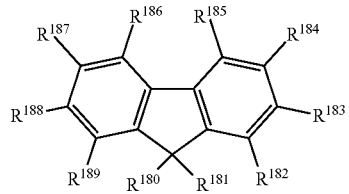

wherein, in Chemical Formula 18,
each of $R^{180}$ to $R^{189}$ is independently hydrogen, an alkyl group, an alkoxy group, an aryl group, a hydroxy group, or a carboxyl group.

A divalent radical derived from a compound represented by any one of Chemical Formulas 16 to 18 may be formed by directly eliminating the substituents of Chemical Formulas 16 to 18, or may be formed by dehydrogenation of the hydrogen atom of the alkyl group, alkoxy group, aryl group, alkylene group, or alkenylene group in the examples of the substituents.

For example, when a divalent radical is derived from a compound of Chemical Formula 16, for example, phenylene, the substitution position of the amine group on the basis of a part connected to N at X$^1$ of Chemical Formula 9 may be ortho, meta, or para, and the substitution position of the amine group on the basis of a part connected to N at X$^2$ of Chemical Formula 9 may also be ortho, meta, or para.

Further, when a divalent radical is derived from a compound of Chemical Formula 17, one of $R^{177}$ to $R^{179}$ of Chemical Formula 17 and one of $R^{172}$ to $R^{174}$ of Chemical Formula 17 may form a radical connected to the nitrogen atom of Chemical Formula 9. Other substituents excluding the substituents forming radicals may independently be hydrogen, an alkyl group, an alkoxy group, or an aryl group, or hydrogen, an alkyl group, or an alkoxy group, or hydrogen or an alkyl group.

More specifically, the compound represented by Chemical Formula 16 may be benzene that may be substituted with at least one hydroxyl group or carboxyl group, but is not limited thereto.

A compound represented by Chemical Formula 17 may be a biphenyl that may be substituted with at least one hydroxyl group or carboxyl group, a compound represented by any one of Chemical Formulas A to F, which may be substituted with at least one hydroxyl group or carboxyl group, or a compound represented by the following Chemical Formulas K to M, which may be substituted with at least one hydroxyl group or carboxyl group, but is not limited thereto.

[Chemical Formula K]

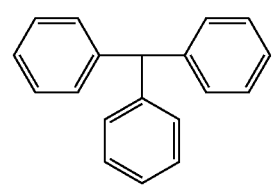

[Chemical Formula L]

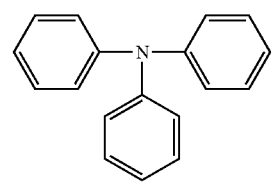

[Chemical Formula M]

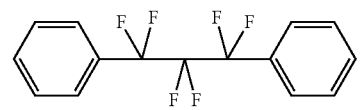

A compound represented by Chemical Formula 18 may be a compound represented by the following Chemical Formula N, or a compound represented by the following Chemical Formula N wherein at least one hydrogen is substituted with a hydroxyl group or a carboxyl group, but is not limited thereto.

[Chemical Formula N]

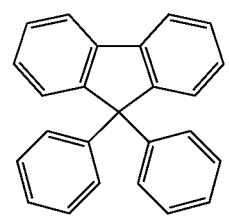

Throughout the specification, the alkyl group may be a C1-20, C1-16, C1-12, C1-8, or C1-4 alkyl group, unless otherwise described. The alkyl group may be linear, branched, or cyclic, and if necessary, may be substituted with one or more substituents.

The alkoxy group may be a C1-20, C1-16, C1-12, C1-8, or C1-4 alkoxy group, unless otherwise described. The alkoxy group may be linear, branched, or cyclic, and if necessary, may be substituted with one or more substituents.

The aryl group means a monovalent residue derived from the above-described aromatic compound, unless otherwise described.

The alkylene group and alkylidene group may be a C1-20, C1-16, C1-12, C1-8, or C1-4 alkylene group and alkylidene group, unless otherwise described. The alkylene group and alkylidene group may be linear, branched, or cyclic, and if necessary, may be optionally substituted with one or more substituents.

Throughout the specification, as the substituent with which the aliphatic compound, alicyclic compound, aromatic compound, alkyl group, alkoxy group, aryl group, alkylene group, alkylidene group, etc. may be optionally substituted, a halogen such as chlorine, fluorine, etc., an epoxy group such as a glycidyl group, an epoxyalkyl group, a glycidoxyalkyl group, an alicyclic epoxy group, etc., an acryloyl group, a methacryloyl group, an isocyanate group, a thiol group, an alkyl group, an alkoxy group, an aryl group, etc., may be mentioned, but is not limited thereto.

Further, in Chemical Formula 9, n means the number of imide repeat units, and it may be a number in the range of 2 to 200, 2 to 150, 2 to 100, 2 to 90, 2 to 80, 2 to 70, 2 to 60, 2 to 50, 2 to 40, 2 to 30, to 20, or 2 to 10.

If n in Chemical Formula 9 is 2 or more, that is, if a compound of Chemical Formula 9 is a polyimide-based compound, it may be more advantageous in terms of heat resistance and strength. Thus, a friction component material including a phthalonitrile resin cured using a polyimide-based compound has higher heat resistance, thus preventing deformation and fusion of the phthalonitrile resin under high velocity and high pressure conditions, and due to higher strength, may exhibit low abrasion and high durability.

Meanwhile, a compound represented by Chemical Formula 9 may be synthesized by a known synthesis method of organic compounds, and the method is not specifically limited. For example, thae compound represented by Chemical Formula 9 may be formed by dehydration condensation of a dianhydride compound and a diamine compound, etc.

A compound represented by Chemical Formula 9 is not volatized or decomposed at a high temperature due to a high boiling point, and thus the curability of a polymerizable composition is stably maintained, and voids that may have a bad influence on the properties are not formed during a high temperature processing or curing process. Thus, for example, the compound may have a decomposition temperature of 300° C. or more, 350° C. ore more, 400° C. or more, or 500° C. or more. The decomposition temperature means a temperature at which the decomposition rate of a compound represented by Chemical Formula 9 is maintained in the range of 10% or less, 5% or less, or 1% or less. The upper limit of the decomposition temperature is not specifically limited, but for example, it may be about 1000° C. or less.

A compound represented by Chemical Formula 9 can easily control the reactivity or process window of the polymerizable composition itself, that is, a difference between the melting temperature and curing temperature of the polymerizable composition or prepolymer formed therefrom, by the selection of the core M or linker $X^1$ or $X^2$, and thus can act as a curing agent with various properties according to the use.

(3) Filler

The low friction polymerizable composition includes a filler that can reduce the erosion of a facing side and increase abrasion resistance in an ultra-high pressure and ultra-high velocity environment, thus affording a low friction property, in an amount of 5 to 100 parts by weight, based on 100 parts by weight of the phthalonitrile compound.

If the filler is used in an amount less than 5 parts by weight, based on 100 parts by weight of the phthalonitrile compound, the composition may not have a sufficiently low coefficient of friction, and thus severe friction and resulting vibration may be generated during rotation at a high velocity and a high pressure. If the filler is used in an amount greater than 100 parts by weight, based on 100 parts by weight of the phthalonitrile compound, sufficiently strength may not be secured, and thus the composition may be destroyed under a high velocity and high pressure condition or by impact.

As the filler, a known inorganic filler or organic filler commonly used in friction materials may be used.

For example, the filler may include one or more low friction particles selected from the group consisting of graphite, polytetrafluoroethylene, tungsten disulfide ($WS_2$), and molybdenum disulfide ($MoS_2$).

In addition to the low friction particles, the filler may further include one or more particles selected from the group consisting of glass fiber, titanium oxide, antimony trisulfide, antimony trioxide, barium sulfate, calcium hydroxide, calcium carbonate, magnesium oxide, calcium fluoride, silica, alumina, iron oxide, chromium oxide, zirconium oxide, boron nitride, carbon nanotubes, carbon fiber, and graphene.

(4) Properties of the Low Friction Polymerizable Composition

In order to confirm that the above-explained polymerizable composition exhibits a low friction property, the coefficient of friction and wear rate are measured according to ASTM D3702. Particularly, as confirmed in the examples below, the polymerizable composition exhibits a low coefficient of friction and wear rate due to a low friction property even under high pressure and high rotation velocity conditions against various kinds of friction subject materials, and thus can be applied as a friction component material for automobiles.

Here, the ASTM D3702 standard measures a coefficient of friction and a wear rate of a thrust washer test specimen so as to confirm whether it is appropriate for use as a self-lubricating material, and the coefficient of friction and wear rate according to ASTM D3702 can be measured using the coefficient of friction measuring apparatus as shown in FIG. 1.

Specifically, a method of calculating a coefficient of friction and a wear rate according to ASTM D3702 standard is as follows.

1) A polymerizable composition is cured to prepare a test specimen having a size and thickness prescribed in ASTM D3702.

2) The prepared test specimen is installed in the upper rotary specimen holder of the coefficient of friction measuring apparatus.

3) In the lower stationary specimen holder of the coefficient of friction measuring apparatus, a friction subject material is installed (in FIG. 1, a steel washer is installed as a subject material).

4) Specific pressure (P) and rotation velocity (V) are set in the coefficient of friction measuring apparatus, and a coefficient of friction (f) under a desired PV value (a product of pressure and velocity) can be calculated according to the following Equation 1.

$$f=T/rW \quad \text{[Equation 1]}$$

In Equation 1,

T is torque (N·m) applied to the test specimen, r is the radius (mm) of the test specimen, and W is a vertical force (kg).

Further, wear rate can be calculated as follows: A weight change before/after an experiment is measured and divided by a density, thus obtaining a worn volume, the obtained volume change is divided by the area of a ring to obtain a decreased thickness, and based thereon, wear rate is calculated as a thickness decrease per second ($10^{-10}$ m/s).

The low friction polymerizable composition may not generate thermal deformation when measuring a coefficient of friction of a thrust washer test specimen having a contact area of 1.3 cm² against a carbon steel subject material under a PV value of 2.3 MPa·m/s, according to ASTM D3702. That is, a low friction polymerizable composition according to one embodiment can withstand a velocity and a pressure under a non-lubricant environment of a PV value of 2.3 MPa·m/s.

Specifically, a low friction polymerizable composition may have a coefficient of friction under a non-lubricant condition of 0.28 or less, measured for a thrust washer test specimen having a contact area of 1.3 cm² against a carbon steel subject material under a PV value of 2.3 MPa·m/s, according to ASTM D3702, and a wear rate of $300 \times 10^{-10}$ m/s or less.

Preferably, the coefficient of friction may be 0.27 or less, 0.26 or less, or 0.25 or less, and the lower the coefficient of friction, the better the low friction property, and thus the lower limit is not limited, but for example, it may be 0.05 or more, 0.10 or more, 0.11 or more, 0.12 or more, or 0.13 or more.

Further, preferably, the wear rate ($10^{-10}$ m/s) may be 270 or less, 250 or less, 230 or less, or 210 or less, and the lower the wear rate, the better the low friction property, and thus the lower limit is not limited, but for example, it may be 40 or more, 50 or more, or 60 or more.

The low friction polymerizable composition may not generate thermal deformation when measuring a coefficient of friction of a thrust washer test specimen having a contact area of 1.3 cm² against a carbon steel subject material even under a PV value of 4.6 MPa·m/s, according to ASTM D3702.

That is, the low friction polymerizable composition according to one embodiment can withstand a velocity and a pressure under a non-lubricant environment of a PV value of 4.6 MPa·m/s. To the contrary, referring to the examples and comparative examples below, in the case of a test specimen that does not include the phthalonitrile compound, under a PV value of 4.6 MPa·m/s, thermal deformation occurs or measurement cannot be conducted because of vibration due to severe friction.

Further, the low friction polymerizable composition may not generate thermal deformation, when measuring a coefficient of friction of a thrust washer test specimen having a contact area of 1.3 cm² against an aluminum alloy subject material under a PV value of 2.3 MPa·m/s, according to ASTM D3702. That is, a low friction polymerizable composition according to one embodiment can withstand a velocity and a pressure under a non-lubricant environment of a PV value of 2.3 MPa·m/s.

Specifically, a low friction polymerizable composition may have a coefficient of friction under a non-lubricant condition of 0.2 or less, measured for a thrust washer test specimen having a contact area of 1.3 cm² against an aluminum alloy subject material under a PV value of 2.3 MPa·m/s, according to ASTM D3702, and a wear rate of $1000 \times 10^{-10}$ m/s or less.

Preferably, the coefficient of friction may be 0.17 or less, and the lower the coefficient of friction, the better the low friction property, and thus the lower limit is not limited, but for example, it may be 0.05 or more, 0.10 or more, or 0.15 or more.

In addition, preferably, the wear rate ($10^{-10}$ m/s) may be 900 or less, 800 or less, or 750 or less, and the lower the wear rate, the better the low friction property, and thus the lower limit is not limited, but for example, it may be 100 or more, 150 or more, or 200 or more.

Here, the PV value of 2.3 MPa·m/s can be realized by the pressure (P) of 1.63 MPa and the rotation velocity (V) of 1.41 m/s, and the PV value of 4.6 MPa·m/s can be realized by the pressure (P) of 1.63 MPa and the rotation velocity (V) of 2.82 m/s.

A low friction polymerizable composition may have a process temperature in the range of 150° C. to 350° C. The process temperature means a temperature at which the polymerizable composition exists in a processable state.

Such a process temperature may be, for example, a melting temperature (Tm) or a glass transition temperature (Tg). In this case, the process window of the polymerizable composition, i.e., the absolute value of a difference (Tc−Tp) between the process temperature (Tp) and the curing temperature (Tc) of the phthalonitrile compound and curing agent, may be 30° C. or more, 50° C. or more, or 100° C. or more. For example, the curing temperature (Tc) may be higher than the process temperature (Tp).

Such a range may be advantageous for securing appropriate processability during the process of preparing the friction component material described below. The upper limit of the process window is not specifically limited, but for example, the absolute value of a difference (Tc−Tp) between the process temperature (Tp) and the curing temperature (Tc) may be 400° C. or less, or 300° C. or less.

II. Low Friction Prepolymer

Meanwhile, the present invention provides a prepolymer, which is a reaction product of a low friction polymerizable composition.

A prepolymer state means a state wherein the reaction of a phthalonitrile compound and curing agent has occurred to some degree in the polymerizable composition (for example, polymerization of the A or B stage has partially occurred), but a complete polymerized state has not been reached, and appropriate flowability is exhibited, and thus it is possible to process into the friction component material described below, for example.

Also, the prepolymer state corresponds to a state wherein the polymerization of the polymerizable composition has been progressed to some degree, and it may mean a state wherein the melting viscosity measured in the range of about 150° C. to 250° C. is 10 Pa·s to 100,000 Pa·s, 10 Pa·s to 10,000 Pa·s, or 10 Pa·s to 5,000 Pa·s. Thus, the prepolymer may also exhibit excellent curability, a low melting temperature, and a wide process window, like the polymerizable composition.

For example, the process temperature of the prepolymer may be 150° C. to 350° C. The process temperature means a temperature at which the prepolymer exists in a processable state. Such a process temperature may be, for example, a melting temperature (Tm) or a glass transition temperature (Tg). In this case, the process window of the prepolymer, i.e., the absolute value of a difference (Tc−Tp) between the process temperature (Tp) and the curing temperature (Tc) of the prepolymer, may be 30° C. or more, 50° C. or more, or 100° C. or more. For example, the curing temperature (Tc) may be higher than the process temperature (Tp). Such a range may be advantageous for securing appropriate processability during the process of preparing the friction component material described below, using the prepolymer. The upper limit of the process window is not specifically limited, but for example, the absolute value of a difference (Tc−Tp) between the process temperature (Tp) and the curing temperature (Tc) may be 400° C. or less, or 300° C. or less.

III. Friction Component Material

The present invention provides a friction component material prepared using the above-explained low friction polymerizable composition or prepolymer.

As explained above, the low friction polymerizable composition and a reactant thereof, i.e., a prepolymer, not only have high heat resistance and excellent processability, but also have a low friction property, and thus can be used as a friction component material having durability and reliability even in an ultra-high pressure and ultra-high velocity environment.

The friction component material that can be prepared using the low friction polymerizable composition and prepolymer is a friction component material used for an automobile, an aircraft, an industrial material, etc., and for example, a bearing, a bushing, a thrust washer, an oil seal, a piston ring, a sliding, or a roller.

Preferably, according to the present invention, an oil seal, a thrust washer, and a bushing prepared using the above-explained low friction polymerizable composition or prepolymer is provided.

Such friction component material may be prepared by molding the polymerizable composition and prepolymer into an aimed shape while melting by heating, etc., and then curing it. Such processing and curing may be conducted according to a known method.

The low friction polymerizable composition according to the present invention includes a curing agent and filler together with a phthalonitrile compound, and thus has an excellent low friction property as well as high heat resistance and excellent processability, and thus can prepare a friction component material.

EXAMPLES

Hereinafter, preferable examples are presented for better understanding of the present invention. However, these examples are presented only as illustrations of the present invention, and the scope of the present invention is not limited thereby.

$^1$H-NMR (Nuclear Magnetic Resonance) Analysis

NMR analysis for compounds prepared below was conducted according to the manual of the manufacturing company using 500 MHz NMR equipment of Agilent Inc. Samples for NMR measurement were prepared by dissolving the compound in DMSO (dimethyl sulfoxide)-d6.

Preparation Example 1. Synthesis of a Phthalonitrile Compound (PN1)

A compound of Chemical Formula A1 (PN1) was synthesized as follows.

32.7 g of a compound of Chemical Formula A2 and 120 g of DMF (dimethyl formamide) were introduced into a 3-neck round-bottom flask, and they were stirred at room temperature to dissolve them. Subsequently, 51.9 g of a compound of Chemical Formula A3 was added, and 50 g of DMF was added, and then they were stirred to dissolve them. Subsequently, 62.2 g of potassium carbonate and 50 g of DMF were introduced together, and the temperature was raised to 85° C. while stirring. After reacting for about 5 hours, the solution was cooled to room temperature.

The cooled reaction solution was poured into the aqueous solution of 0.2 N hydrochloric acid to neutralize and precipitate it, and after filtering, washed with water. Thereafter, the filtered reactant was dried in a vacuum oven at 100° C. for a day, wherein water and remaining solvents were removed, and then the compound of Chemical Formula A1 (PN1) was obtained with a yield of about 80 wt %. The $^1$H-NMR analysis results for the obtained compound of Chemical Formula A1 (PN1) are shown in FIG. 2.

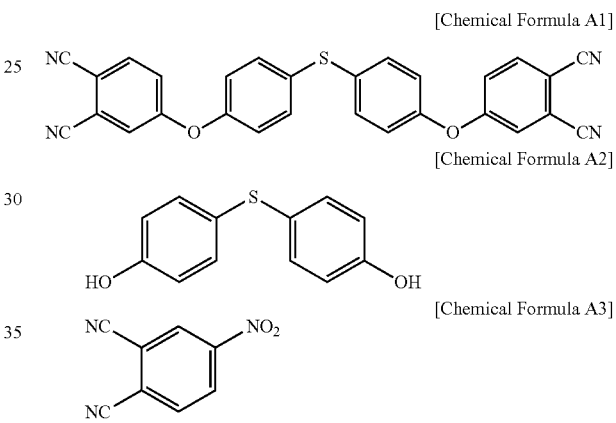

Preparation Example 2. Synthesis of a Phthalonitrile Compound (PN2)

A compound of Chemical Formula A4 (PN2) was synthesized as follows.

28.0 g of 4,4'-bis(hydroxyphenyl)methane and 150 mL of DMF (dimethyl formamide) were introduced into a 500 mL 3-neck round-bottom flask, and they were stirred at room temperature to dissolve them. Subsequently, 48.5 g of 4-nitrophthalonitrile was added, and 50 g of DMF was added, and then they were stirred to dissolve them. Subsequently, 58.1 g of potassium carbonate and 50 g of DMF were introduced together, and the temperature was raised to 85° C. while stirring. After reacting for about 5 hours, the solution was cooled to room temperature.

The cooled reaction solution was poured into an aqueous solution of 0.2 N hydrochloric acid to neutralize and precipitate it, and after filtering, it was washed with water. Thereafter, the filtered reactant was dried in a vacuum oven of 100° C. for a day, such that water and remaining solvents were removed, and then the target compound (PN2) was obtained with a yield of about 83 wt %. The $^1$H-NMR analysis results for the obtained compound of Chemical Formula A4 (PN2) are shown in FIG. 3.

[Chemical Formula A4]

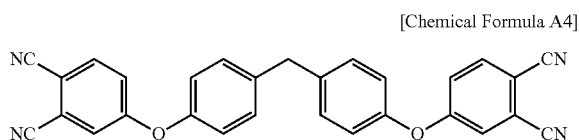 [SMILES: N#Cc1ccc(Oc2ccc(Cc3ccc(Oc4ccc(C#N)c(C#N)c4)cc3)cc2)cc1C#N]

Preparation Example 3. Synthesis of a Phthalonitrile Compound (PN3)

A compound of Chemical Formula A5 (PN3) was synthesized as follows.

160 g of the compound of Chemical Formula A6 and 200 g of DMF (dimethyl formamide) were introduced into a 3-neck round-bottom flask, and stirred at room temperature to dissolve them. Subsequently, 52 g of a compound of Chemical Formula A3 was added, and 200 g of DMF was added, and then they were stirred to dissolve them. Subsequently, 62.2 g of potassium carbonate and 100 g of DMF were introduced together, and the temperature was raised to 85° C. while stirring. After reacting for about 5 hours, the solution was cooled to room temperature.

The cooled reaction solution was poured into an aqueous solution of 0.2 N hydrochloric acid. To the mixed solution, chloroform was added to extract the product, and the extracted product was washed with water. The chloroform and the reaction solution DMF (dimethyl formamide) were removed by vacuum distillation. After removing water and remaining solvents, the compound of Chemical Formula A5 (PN3) was obtained with a yield of about 87 wt %. The $^1$H-NMR analysis results for the obtained compound of Chemical Formula A5 are shown in FIG. 4, and the weight average molecular weight was about 1350 g/mol.

[Chemical Formula A5]

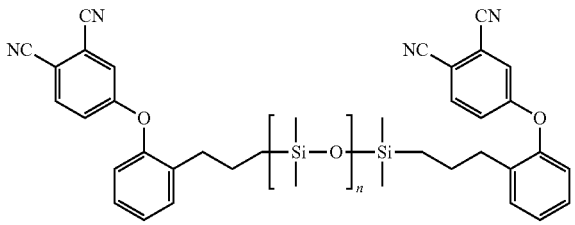

In Chemical Formula A5, n is 10.

[Chemical Formula A6]

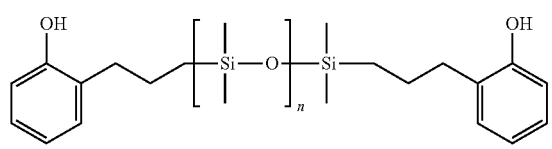

In Chemical Formula A6, n is 10.

Preparation Example 4. Synthesis of a Phthalonitrile Compound (PN4)

A compound of Chemical Formula A7 (PN4) was synthesized as follows.

181 g of a compound of Chemical Formula A8 and 200 g of DMF (dimethyl formamide) were introduced into a 3-neck round-bottom flask, and they were stirred at room temperature to dissolve them. Subsequently, 35 g of a compound of Chemical Formula A3 was added, and 200 g of DMF was added, and then they were stirred to dissolve them. Subsequently, 41.5 g of potassium carbonate and 100 g of DMF were introduced together, and the temperature was raised to 85° C. while stirring. After reacting for about 5 hours, the solution was cooled to room temperature.

The cooled reaction solution was poured into an aqueous solution of 0.2 N hydrochloric acid. To the mixed solution, chloroform was added to extract the product, and the extracted product was washed with water. The chloroform and the reaction solution DMF (dimethyl formamide) were removed by vacuum distillation. After removing water and remaining solvents, a compound of Chemical Formula A7 (PN4) was obtained with a yield of about 88 wt %. The $^1$H-NMR analysis results for the obtained compound of Chemical Formula A7 are shown in FIG. 5, and the weight average molecular weight was about 2100 g/mol.

[Chemical Formula A7]

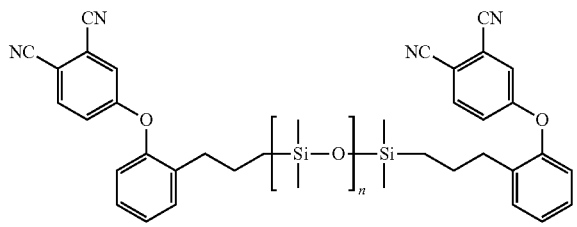

In Chemical Formula A7, n is 20.

[Chemical Formula A8]

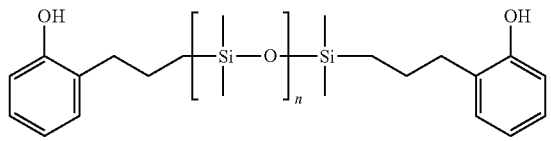

In Chemical Formula A8, n is 20.

Preparation Example 5. Synthesis of a Phthalonitrile Compound (PN5)

A compound of Chemical Formula A9 (PN5) was synthesized as follows.

56 g of A compound of Chemical Formula A10 and 50 g of DMF (dimethyl formamide) were introduced into a 3-neck round-bottom flask, and they were stirred at room temperature to dissolve them. Subsequently, 4.5 g of the compound of Chemical Formula A3 was added, and 50 g of DMF was added, and then they were stirred to dissolve them. Subsequently, 5.4 g of potassium carbonate and 30 g of DMF were introduced together, and the temperature was raised to 85° C. while stirring. After reacting for about 5 hours, the solution was cooled to room temperature.

The cooled reaction solution was poured into the aqueous solution of 0.2 N hydrochloric acid. To the mixed solution, chloroform was added to extract the product, and the extracted product was washed with water. The chloroform and the reaction solution DMF (dimethyl formamide) were removed by vacuum distillation. After removing water and remaining solvents, a compound of Chemical Formula A9 (PN5) was obtained with a yield of about 87 wt %. The $^1$H-NMR analysis results for the obtained compound of Chemical Formula A9 are shown in FIG. 6, and the weight average molecular weight was about 4600 g/mol.

[Chemical Formula A9]

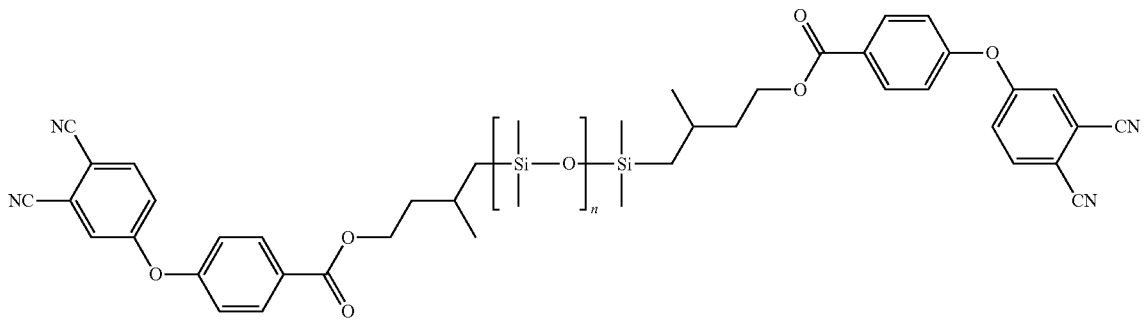

In Chemical Formula A9, n is 53.

[Chemical Formula A10]

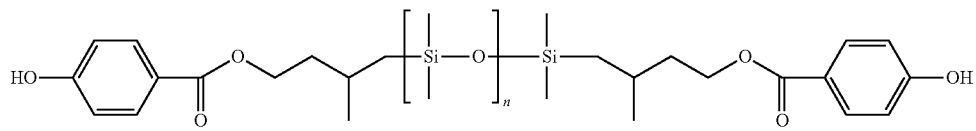

In Chemical Formula A10, n is 53.

Preparation Example 6. Synthesis of a Phthalonitrile Compound (PN6)

A compound with the average compositional formula of Chemical Formula A11 (PN6) was synthesized as follows.

110 g of a compound having the average compositional formula of Chemical Formula A12 and the weight average molecular weight of 6,700 g/mol, and 200 g of DMF (dimethyl formamide) were introduced into a 3-neck round-bottom flask, and they were stirred at room temperature to dissolve them. Subsequently, 25 g of a compound of Chemical Formula A3 was added, and 60 g of DMF was added, and then they were stirred to dissolve them. Then, 29 g of potassium carbonate and 50 g of DMF were introduced together, and the temperature was raised to 85° C. while stirring. After reacting for about 5 hours, the solution was cooled to room temperature.

The cooled reaction solution was poured into the aqueous solution of 0.2 N hydrochloric acid. To the mixed solution, chloroform was added to extract the product, and the extracted product was washed with water. The chloroform and the reaction solution DMF (dimethyl formamide) were removed by vacuum distillation. After removing water and remaining solvents, a compound (PN6) having the average compositional formula of Chemical Formula A11 and the weight average molecular weight of 7190 g/mol was obtained with a yield of about 88 wt %. The $^1$H-NMR analysis results for the compound of Chemical Formula A11 are shown in FIG. 7.

$$[R^1Me_2SiO_{1/2}]_{0.065}[R^1MeSiO_{2/2}]_{0.161}$$
$$[Me_2SiO_{2/2}]_{0.774}$$
[Chemical Formula A11]

In Chemical Formula A11, Me is a methyl group, and $R^1$ is a 2-(2-hydroxyphenyl)ethyl group or 4-(2-ethylphenoxy) phthalonitrile, represented by the following Chemical Formula 2.

$$[R^1Me_2SiO_{1/2}]_{0.065}[R^1MeSiO_{2/2}]_{0.161}$$
$$[Me_2SiO_{2/2}]_{0.774}$$
[Chemical Formula A12]

In Chemical Formula A12, Me is a methyl group, and $R^1$ is a 2-(2-hydroxyphenyl)ethyl group.

[Chemical Formula 2]

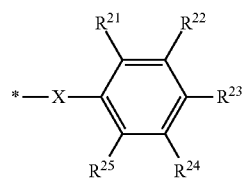

Preparation Example 7. Synthesis of a Phthalonitrile Compound (PN7)

A compound with the average compositional formula of Chemical Formula A13 (PN7) was synthesized as follows.

95 g of a compound having the average compositional formula of the following Chemical Formula A12 and the weight average molecular weight of 6,700 g/mol, and 200 g of DMF (dimethyl formamide), were introduced into a 3-neck round-bottom flask, and they were stirred at room temperature to dissolve them. Subsequently, 36.5 g of a compound of Chemical Formula A3 was added, and 100 g of DMF was added, and then they were stirred to dissolve them. Then, 44 g of potassium carbonate and 50 g of DMF were introduced together, and the temperature was raised to 85° C. while stirring. After reacting for about 5 hours, the solution was cooled to room temperature.

The cooled reaction solution was poured into the aqueous solution of 0.2 N hydrochloric acid. To the mixed solution, chloroform was added to extract the product, and the extracted product was washed with water. The chloroform and the reaction solution DMF (dimethyl formamide) were removed by vacuum distillation. After removing water and remaining solvents, the compound (PN7) having the average compositional formula of Chemical Formula A13 and the weight average molecular weight of 7,660 g/mol was obtained with a yield of about 85 wt %. The compound them. The solution was cooled with a water bath, and 8.7 g of a compound of Chemical Formula A15 was divided into three parts and gradually introduced together with 40 g of NMP. When the introduced compounds were completely dissolved, 16 g of toluene was added to the reactant to form an azeotrope. A Dean-Stark apparatus and a reflux condenser were installed, and the Dean-Stark apparatus was filled with toluene. 4.2 mL of pyridine was introduced as a dehydrogenation condensation catalyst, the temperature was raised to 170° C., and the solution was stirred for 3 hours. While removing water generated with the formation of an imide ring with the Dean-Stark apparatus, the solution was additionally stirred for 2 hours, and the remaining toluene and pyridine were removed.

The reaction product was cooled to room temperature, and precipitated in methanol to recover it. The recovered precipitate was extracted with methanol to remove remaining reactants, and dried in a vacuum oven to obtain a compound of Chemical Formula A14 (CA1) with a yield of about 85 wt %. The $^1$H-NMR analysis results of the obtained compound of Chemical Formula A14 (CA1) are shown in FIG. 9.

[Chemical Formula A14]

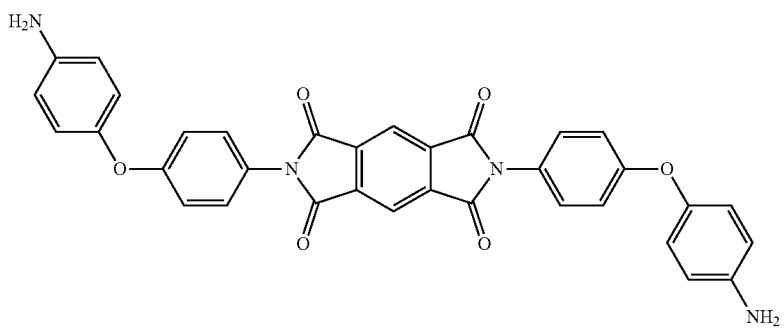

[Chemical Formula A15]

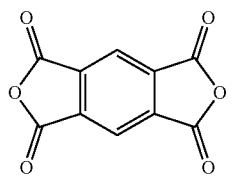

(PN7) of the average compositional formula of Chemical Formula A13 is a compound wherein all of $R_1$ to $R_5$ in Chemical Formula 2 are substituted with phthalonitrile groups, and the $^1$H-NMR analysis results are shown in FIG. 8.

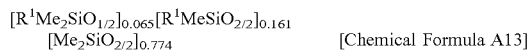

[Chemical Formula A13]

In Chemical Formula A13, Me is a methyl group, and $R^1$ is 4-(2-ethylphenoxy)phthalonitrile represented by Chemical Formula 2.

Preparation Example 8. Synthesis of a Curing Agent Compound (CA1)

A compound of the following Chemical Formula A14 (CA1) was synthesized by dehydrogenation condensation of diamine and dianhydride.

24 g of 4,4'-oxydianiline and 40 g of NMP (N-methyl-pyrrolidone) were introduced into a 3-neck round-bottom flask, and they were stirred at room temperature to dissolve Preparation Example 9. Synthesis of a Curing Agent Compound (CA2)

A compound of the following Chemical Formula A18 (CA2) was synthesized by dehydrogenation condensation of diamine and dianhydride.

8.1 g of the compound of Chemical Formula A16 (m-phenylene diamine) and 50 g of NMP (N-methyl-pyrrolidone) were introduced into a 3-neck round-bottom flask, and they were stirred at room temperature to dissolve them. The solution was cooled with a water bath, and 26 g of a compound of the following Chemical Formula A17 was divided into three parts and gradually introduced together with 60 g of NMP. When the introduced compounds were completely dissolved, 23 g of toluene was added to the reactant to form an azeotrope. A Dean-Stark apparatus and a reflux condenser were installed, and the Dean-Stark apparatus was filled with toluene. 5.2 mL of pyridine was introduced as a dehydrogenation condensation catalyst, the temperature was raised to 170° C., and the solution was stirred for 3 hours. While removing water generated with the formation of an imide ring with the Dean-Stark apparatus, the solution was additionally stirred for 2 hours, and the remaining toluene and pyridine were removed.

The reaction product was cooled to room temperature, and precipitated in methanol to recover it. The recovered precipitate was Soxhlet-extracted with methanol to remove remaining reactants, and dried in a vacuum oven to obtain a compound of Chemical Formula A18 (CA2) with a yield of about 93 wt %. The $^1$H-NMR analysis results of the obtained compound of Chemical Formula A18 (CA2) are shown in FIG. 10.

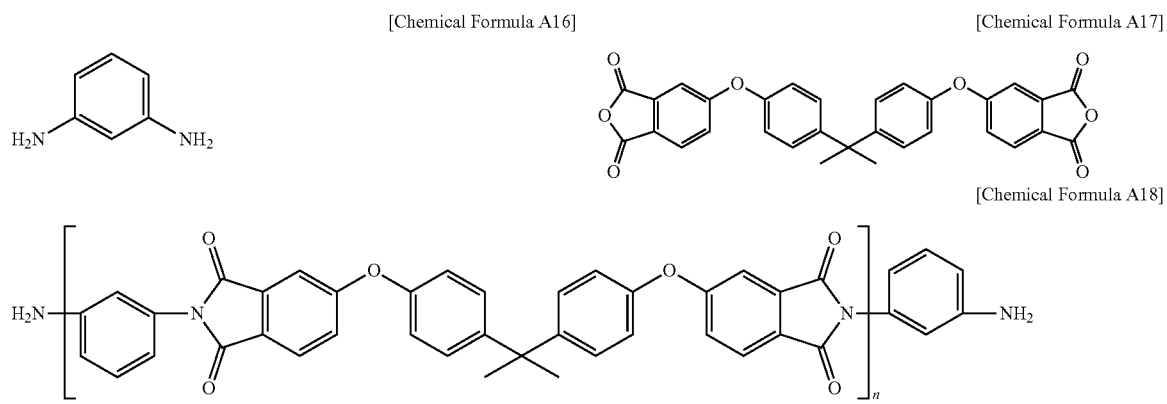

[Chemical Formula A16]

[Chemical Formula A17]

[Chemical Formula A18]

In Chemical Formula A18, n is about 3.

Example 1

100 parts by weight of the compound of Preparation Example 1 (PN1), about 0.1 moles of the compound of Preparation Example 8 (CA1) based on 1 mole of the compound (PN1), and 17.6 parts by weight of graphite were properly mixed to prepare a polymerizable composition.

Example 2

90 parts by weight of the compound of Preparation Example 1 (PN1), 10 parts by weight of the compound of Preparation Example 3 (PN3), about 0.1 moles of the compound of Preparation Example 8 (CA1) based on 1 mole of the compound (PN1) and the compound (PN3), and 11.1 parts by weight of graphite were properly mixed to prepare a polymerizable composition.

Example 3

100 parts by weight of the compound of Preparation Example 1 (PN1), about 0.1 moles of the compound of Preparation Example 8 (CA1) based on 1 mole of the compound (PN1), and 12.5 parts by weight of Teflon particles of a micron size were properly mixed to prepare a polymerizable composition.

Example 4

100 parts by weight of the compound of Preparation Example 2 (PN2), about 0.1 moles of the compound of Preparation Example 8 (CA1) based on 1 mole of the compound (PN1), and 17.6 parts by weight of graphite were properly mixed to prepare a polymerizable composition.

Example 5

90 parts by weight of the compound of Preparation Example 2 (PN2), 10 parts by weight of the compound of Preparation Example 3 (PN3), about 0.1 moles of the compound of Preparation Example 8 (CA1) based on 1 mole of the compound (PN2) and the compound (PN3), and 11.1 parts by weight of graphite were properly mixed to prepare a polymerizable composition.

Example 6

100 parts by weight of the compound of Preparation Example 1 (PN1), about 0.1 moles of the compound of Preparation Example 9 (CA2) based on 1 mole of the compound (PN1), and 17.6 parts by weight of graphite were properly mixed to prepare a polymerizable composition.

Example 7

100 parts by weight of the compound of Preparation Example 2 (PN2), about 0.1 moles of the compound of Preparation Example 9 (CA2) based on 1 mole of the compound (PN2), and 17.6 parts by weight of graphite were properly mixed to prepare a polymerizable composition.

Example 8

95 parts by weight of the compound of Preparation Example 2 (PN2), 5 parts by weight of the compound of Preparation Example 4 (PN4), about 0.1 moles of the compound of Preparation Example 8 (CA1) based on 1 mole of the compound (PN2) and the compound (PN4), and 17.6 parts by weight of graphite were properly mixed to prepare a polymerizable composition.

Example 9

95 parts by weight of the compound of Preparation Example 2 (PN2), 5 parts by weight of the compound of Preparation Example 5 (PN5), about 0.1 moles of the compound of Preparation Example 8 (CA1) based on 1 mole of the compound (PN2) and the compound (PN5), and 17.6 parts by weight of graphite were properly mixed to prepare a polymerizable composition.

Example 10

95 parts by weight of the compound of Preparation Example 2 (PN2), 5 parts by weight of the compound of Preparation Example 6 (PN6), about 0.1 moles of the compound of Preparation Example 8 (CA1) based on 1 mole of the compound (PN2) and the compound (PN6), and 17.6 parts by weight of graphite were properly mixed to prepare a polymerizable composition.

Example 11

95 parts by weight of the compound of Preparation Example 2 (PN2), 5 parts by weight of the compound of Preparation Example 7 (PN7), about 0.1 moles of the compound of Preparation Example 8 (CA1) based on 1 mole of the compound (PN2) and the compound (PN7), and 17.6 parts by weight of graphite were properly mixed to prepare a polymerizable composition.

Example 12

100 parts by weights of the compound of Preparation Example 2 (PN2), about 0.1 moles of the compound of Preparation Example 8 (CA1) based on 1 mole of the compound (PN2), 10 parts by weight of molybdenum disulfide particles, and 20 parts by weight of graphite were properly mixed to prepare a polymerizable composition.

Example 13

100 parts by weights of the compound of Preparation Example 2 (PN2), about 0.1 moles of the compound of Preparation Example 8 (CA1) based on 1 mole of the compound (PN2), 10 parts by weight of tungsten disulfide particles, and 20 parts by weight of graphite were properly mixed to prepare a polymerizable composition.

Comparative Example 1

A low friction grade product 450FC30 from Victrex Company was commercially acquired and used. The 450FC30 product is known to contain PEEK resin, 10 wt % of graphite, 10 wt % of Teflon particles, and 10 wt % of carbon fiber (based on 100 parts by weight of PEEK resin, 14.3 parts by weight of graphite, 14.3 parts by weight of Teflon particles, and 14.3 parts by weight of carbon fiber).

Comparative Example 2

A low friction grade product Vespel-SP21 from DuPont Company was commercially acquired and used. The Vespel-SP21 product is known to contain polyimide resin and 15 wt % of graphite (based on 100 parts by weight of PI resin and 17.6 parts by weight of graphite).

Comparative Example 3

100 parts by weights of the compound of Preparation Example 1 (PN1), and about 0.1 moles of the compound of Preparation Example 8 (CA1) based on 1 mole of the compound (PN1) were properly mixed to prepare a polymerizable composition.

Comparative Example 4

100 parts by weights of the compound of Preparation Example 2 (PN2), and about 0.1 moles of the compound of Preparation Example 8 (CA1) based on 1 mole of the compound (PN2) were properly mixed to prepare a polymerizable composition.

Experimental Example 1—Evaluation of Coefficient of Friction and Wear Rate of Carbon Steel Subject Material Each polymerizable composition prepared in the examples and comparative examples was melted at 240° C. and stirred for 5 minutes to prepare a prepolymer, and then the prepared prepolymer was put in a mold and melted and cured under conditions of 200° C. for 2 hours, 250° C. for 2 hours, 300° C. 2 hours, and 350° C. for 2 hours to prepare test specimens according to the ASTM D3702 standard. Further, the products of Comparative Examples 1 and 2 were cut to prepare test specimens according to the ASTM D3702 standard.

Here, as a carbon steel subject material, S45C was prepared. S45C is a carbon steel material for machine structure, and is a steel material containing 0.45% of carbon according to the JIS G4053 standard.

According to the above-explained ASTM D3702 standard, coefficients of friction and wear rates of the prepared test specimens of the examples and comparative examples were measured using a coefficient of friction measuring apparatus (manufactured by Phoenix), specific measuring conditions are as follows, and the results are shown in the following Table 1.

PV value 1: 2.3 MPa·m/s (pressure (P): 1.63 MPa (16 bar, 220 N), rotation velocity (V): 1.41 m/s (1000 rpm))
PV value 2: 4.6 MPa·m/s (pressure (P): 1.63 MPa (16 bar, 220 N), rotation velocity (V): 2.82 m/s (2000 rpm))
Time: 1200 s
Unlubricated operation

TABLE 1

|  | | PV value 1 condition | | Thermal deformation |
|---|---|---|---|---|
|  | Kind of resin | Coefficient of friction | Wear rate ($10^{-10}$ m/s) | under PV value 2 condition |
| Example 1 | phthalonitrile | 0.25 | 106.4 | X |
| Example 2 | phthalonitrile | 0.17 | 205.8 | X |
| Example 3 | phthalonitrile | 0.16 | 69 | X |
| Example 4 | phthalonitrile | 0.22 | 76.5 | X |
| Example 5 | phthalonitrile | 0.13 | 124.4 | X |
| Example 6 | phthalonitrile | 0.25 | 77.7 | X |
| Example 7 | phthalonitrile | 0.21 | 73.3 | X |
| Example 8 | phthalonitrile | 0.08 | 47.2 | X |
| Example 9 | phthalonitrile | 0.15 | 87.3 | X |
| Example 10 | phthalonitrile | 0.17 | 52.9 | X |

TABLE 1-continued

|  | Kind of resin | PV value 1 condition | | Thermal deformation under PV value 2 condition |
|---|---|---|---|---|
|  |  | Coefficient of friction | Wear rate ($10^{-10}$ m/s) |  |
| Example 11 | phthalonitrile | 0.17 | 82.3 | X |
| Example 12 | phthalonitrile | 0.23 | 119.3 | X |
| Example 13 | phthalonitrile | 0.17 | 90.6 | X |
| Comparative Example 1 | PEEK | 0.18 | 56.9 | ○ |
| Comparative Example 2 | PI | 0.29 | 360.1 | Unmeasurable |
| Comparative Example 3 | phthalonitrile | unmeasurable | unmeasurable |  |
| Comparative Example 4 | phthalonitrile | unmeasurable | unmeasurable |  |

Referring to Table 1, it is confirmed that the test specimens according to Examples 1, 4, 6, and 7 have lower coefficients of friction and lower wear rates than the test specimen of Comparative Example 2 including the same amount of graphite, and the test specimen according to Example 3 has a lower coefficient of friction than the test specimen of Comparative Example 1 including the same amounts of graphite and Teflon particles.

In addition, it can be seen that although Examples 2 and 5 only contain the same amount (wt %) of graphite and do not contain Teflon particles capable of further providing a low friction property, they have lower coefficients of friction than the test specimen according to Comparative Example 1.

Further, it was additionally confirmed that in the case of the test specimen of Comparative Example 2, thermal oxidation of the subject material S45C occurred under the PV value 1 condition, and thus surface discoloration occurred. In addition, in the case of the test specimens of Comparative Examples 3 and 4 which do not contain a graphite filler, even under a PV value 1 condition, due to severe friction vibration, a coefficient of friction and a wear rate could not be measured.

Also, when evaluating under the PV value 2, a more severe condition than the PV value 1, the test specimens according to Examples 1 to 7 could be evaluated, but the test specimen according to Comparative Example 1 was melted by thermal deformation within 5 minutes due to high friction heat, and the test specimen according to Comparative Example 2 induced breakdown of the apparatus due to sever vibration, and thus the measurement was stopped.

Experimental Example 2—Evaluation of Coefficient of Friction and Wear Rate of Aluminum Alloy Subject Material The polymerizable compositions prepared in Examples 1, 2, 4, and 5 were prepared into test specimens according to ASTM D3702 using the same method as in Experimental Example 1. The products of Comparative Examples 1 and 2 were cut to prepare test specimens according to ASTM D3702. For the prepared test specimens, coefficients of friction and wear rates were measured under the PV value 1 condition, identical to Experimental Example 1, except that an aluminum alloy was used as a subject material according to the above-explained ASTM D3702, and the results are shown in the following Table 2.

In order to observe the wear degree of the subject material, a photograph of the subject material after evaluating a coefficient of friction and a wear rate is shown in FIG. 11, and the wear amount of the subject material per unit time, calculated by dividing the weight change of the subject material before/after evaluation by measuring time, is shown in Table 2.

Here, as the aluminum alloy subject material, 2024 was prepared.

TABLE 2

|  | Kind of resin | PV value 1 condition | | |
|---|---|---|---|---|
|  |  | Coefficient of friction | Wear rate ($10^{-10}$ m/s) | Wear amount of subject material ($10^{-7}$ g/s) |
| Example 1 | phthalonitrile | 0.17 | 262.2 | 20.0 |
| Example 2 | phthalonitrile | 0.17 | 722.4 | 31.5 |
| Example 4 | phthalonitrile | 0.15 | 672.5 | 4.4 |
| Example 5 | phthalonitrile | 0.15 | 284.5 | 33.5 |
| Comparative Example 1 | PEEK | 0.13 | 548.2 | 173.4 |
| Comparative Example 2 | PI | 0.19 | 1115.4 | 59.2 |

Referring to Table 2, it is confirmed that the test specimens of Examples 1 and 4 have lower coefficients of friction and remarkably lower wear rates compared to the test specimen of Comparative Example 2 including the same amount of graphite, and the wear amount of the subject material is much less. Further, it can be seen that, although Examples 2 and 5 only contain the same amount of graphite and do not contain Teflon particles capable of further providing a low friction property, they have lower wear rates than the test specimen of Comparative Example 1.

In addition, referring to FIG. 11, it is confirmed that the test specimen of Example 1 hardly damaged the surface of aluminum alloy subject material during the evaluation, while the test specimen of Comparative Example 1 severely wore the subject material such as with a deep groove on the surface of the subject material, etc., and thus the evaluation had to be stopped within 10 minutes. It is also confirmed that the test specimen of Comparative Example 2 also damaged the surface of the subject material compared to Example 1.

Thus, it can be seen through the results of Experimental Examples 1 and 2 that a polymerizable composition including a phthalonitrile compound has excellent friction and wear properties under a high pressure and high rotation speed condition, compared to the composition including the existing high heat resistant and low friction resin PEEK or PI, and thus is suitable for use as a friction component material.

The invention claimed is:
1. A polymerizable composition comprising:
100 parts by weight of a phthalonitrile compound;
0.02 to 1.5 moles of a curing agent, based on 1 mole of the phthalonitrile compound; and
5 to 100 parts by weight of a filler;
wherein the curing agent is an imide-based compound represented by Chemical Formula 9:

[Chemical Formula 9]

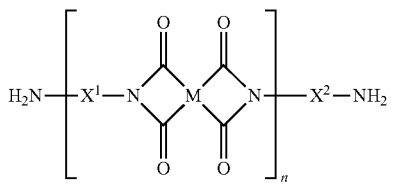

wherein, in Chemical Formula 9, M is a tetravalent radical derived from an aliphatic, alicyclic, or aromatic compound, each of $X^1$ and $X^2$ is independently an alkylene group, an alkylidene group, or a divalent radical derived from an aromatic compound, and n is 2 to 200; and
wherein the phthalonitrile compound comprises one or more compounds represented by compositional formula of Chemical Formula 1 and compounds represented by compositional formula of Chemical Formula 5:

[R11R122SiO1/2]a[R11R12SiO2/2]b[R122SiO2/2]c
[R11SiO3/2]d[R12SiO3/2]e[SiO4/2]f    [Chemical Formula 1]

wherein, in Chemical Formula 1,
each R11 is independently a substituent of the following Chemical Formula 2,
each R12 is independently hydrogen, an alkyl group, an alkenyl group, an alkynyl group, an alkoxy group, or an aryl group,
each of a, b, and c is a positive number,
each of d, e, and f is 0 or a positive number, and
a+b+c+d+e+f is 1;

[Chemical Formula 2]

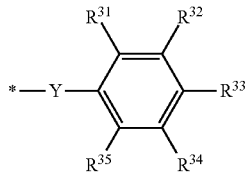

wherein, in Chemical Formula 2,
X is a group connected to the silicon atom of Chemical Formula 1, and is a single bond, an oxygen atom, a sulfur atom, —S(=O)2—, a carbonyl group, an alkylene group, an alkenylene group, an alkynylene group, —C(=O)—X1—, or —X1—C(=O)—, and X1 is an oxygen atom, a sulfur atom, —S(=O)2—, an alkylene group, an alkenylene group, or an alkynylene group,
each of R21 to R25 is independently hydrogen, an alkyl group, an alkoxy group, a hydroxyl group, a cyano group, or a substituent of the following Chemical Formula 3, and at least one of R21 to R25 is a substituent of the following Chemical Formula 3;

[Chemical Formula 3]

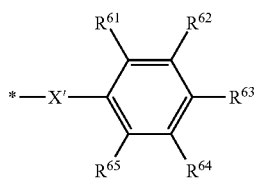

wherein, in Chemical Formula 3,
Y is a single bond, an oxygen atom, a sulfur atom, —S(=O)2—, a carbonyl group, an alkylene group, an alkenylene group, an alkynylene group, —C(=O)—X1—, or —X1—C(=O)—, and X1 is an oxygen atom, a sulfur atom, —S(=O)2—, an alkylene group, an alkenylene group, or an alkynylene group,
each of R31 to R35 is independently hydrogen, an alkyl group, an alkoxy group, a hydroxyl group, or a cyano group, and two or more of R31 to R35 are cyano groups;

R51aR52bSiO(4−a−b)/2    [Chemical Formula 5]

wherein, in Chemical Formula 5,
R51 is a substituent of the following Chemical Formula 6,
each R52 is independently hydrogen, an alkyl group, an alkenyl group, an alkynyl group, an alkoxy group, or an aryl group,
a is 0.01 to 0.4, and
b is 0.5 to 4;

[Chemical Formula 6]

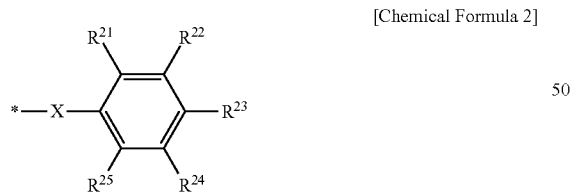

wherein, in Chemical Formula 6,
X' is a group connected to the silicon atom of Chemical Formula 5, and is a single bond, an oxygen atom, a sulfur atom, —S(=O)2—, a carbonyl group, an alkylene group, an alkenylene group, an alkynylene group, —C(=O)—X1—, or —X1—C(=O)—, and X1 is an oxygen atom, a sulfur atom, —S(=O)2—, an alkylene group, an alkenylene group, or an alkynylene group,
each of R61 to R65 is independently hydrogen, an alkyl group, an alkoxy group, a hydroxyl group, a cyano group, or a substituent of the following Chemical Formula 7, and at least one of R61 to R65 is a substituent of the following Chemical Formula 7;

[Chemical Formula 7]

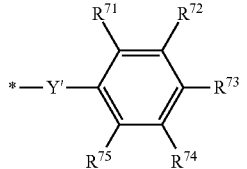

wherein, in Chemical Formula 7,

Y' is a single bond, an oxygen atom, a sulfur atom, —S(=O)2—, a carbonyl group, an alkylene group, an alkenylene group, an alkynylene group, —C(=O)—X1—, or —X1—C(=O)—, and X1 is an oxygen atom, a sulfur atom, —S(=O)2—, an alkylene group, an alkenylene group, or an alkynylene group, each of R71 to R75 is independently hydrogen, an alkyl group, an alkoxy group, a hydroxyl group, or a cyano group, and two or more of R71 to R75 are cyano groups.

2. The polymerizable composition according to claim 1, wherein M in Chemical Formula 9 is a tetravalent radical derived from alkane, alkene, or alkyne, or a tetravalent radical derived from the compound represented by any one of the following Chemical Formulas 10 to 15:

[Chemical Formula 10]

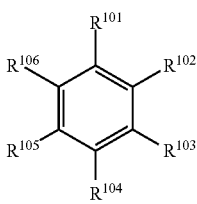

wherein, in Chemical Formula 10, each of $R^{101}$ to $R^{106}$ is independently hydrogen, an alkyl group, an alkoxy group, or an aryl group;

[Chemical Formula 11]

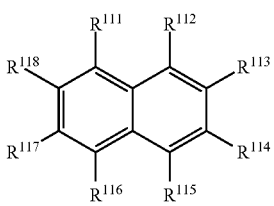

wherein, in Chemical Formula 11, each of $R^{111}$ to $R^{118}$ is independently hydrogen, an alkyl group, an alkoxy group, or an aryl group;

[Chemical Formula 12]

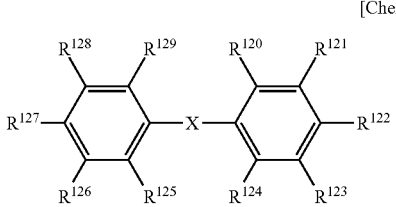

wherein, in Chemical Formula 12, each of $R^{120}$ to $R^{129}$ is independently hydrogen, an alkyl group, an alkoxy group, or an aryl group, X is a single bond, an alkylene group, an alkylidene group, —O—, —S—, —C(=O)—, —S(=O)—, —S(=O)$_2$—, —C(=O)—O-L$^1$-O—C(=O)—, -L$^2$-C(=O)—O-L$^3$-, -L$^4$-O—C(=O)-L$^5$-, or -L$^6$-Ar$^1$-L$^7$-Ar$^2$-L$^8$-, each of L$^1$ to L$^8$ is independently a single bond, —O—, an alkylene group, or an alkylidene group, and each of Ar$^1$ and Ar$^2$ is independently an arylene group;

[Chemical Formula 13]

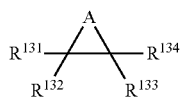

wherein, in Chemical Formula 13, each of $R^{131}$ to $R^{134}$ is independently hydrogen, an alkyl group, or an alkoxy group, and two of $R^{131}$ to $R^{134}$ may be connected to each other to form an alkylene group, A is an alkylene group or an alkenylene group, and the alkylene group or alkenylene group of A may comprise one or more oxygen atoms as a heteroatom:

[Chemical Formula 14]

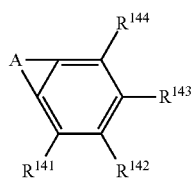

wherein, in Chemical Formula 14, each of $R^{141}$ to $R^{144}$ is independently hydrogen, an alkyl group, or an alkoxy group, and A is an alkylene group;

[Chemical Formula 15]

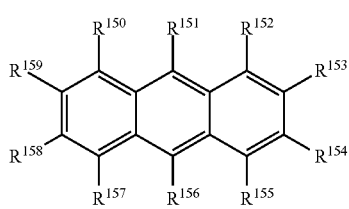

wherein, in Chemical Formula 15, each of $R^{150}$ to $R^{159}$ is independently hydrogen, an alkyl group, or an alkoxy group.

3. The polymerizable composition according to claim 1, wherein, in Chemical Formula 9, each of $X^1$ and $X^2$ is independently a divalent radical derived from a C6-40 aromatic compound.

4. The polymerizable composition according to claim 3, wherein, in Chemical Formula 9, each of $X^1$ and $X^2$ is independently a divalent radical derived from the compounds represented by any one of the following Chemical Formulas 16 to 18:

[Chemical Formula 16]

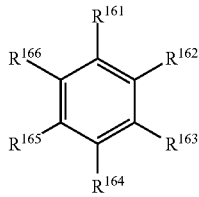

wherein, in Chemical Formula 16,
each of $R^{161}$ to $R^{166}$ is independently hydrogen, an alkyl group, an alkoxy group, an aryl group, a hydroxy group, or a carboxyl group;

[Chemical Formula 17]

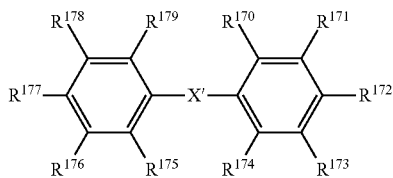

wherein, in Chemical Formula 1,
each of $R^{170}$ to $R^{179}$ is independently hydrogen, an alkyl group, an alkoxy group, an aryl group, a hydroxy group, or a carboxyl group,
X' is a single bond, an alkylene group, an alkylidene group, —O—, —S—, —C(=O)—, —NR$^a$—, —S(=O)—, —S(=O)$_2$—, -L$^9$-Ar$^3$-L$^{10}$-, or -L$^{11}$-Ar$^4$-L$^{12}$-Ar$^5$-L$^{13}$-, R$^a$ is hydrogen, an alkyl group, an alkoxy group, or an aryl group, each of L$^9$ to L$^{13}$ is independently a single bond, —O—, an alkylene group, or an alkylidene group, and each of Ar$^3$ to Ar$^5$ is independently an arylene group;

[Chemical Formula 18]

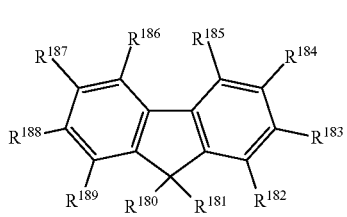

wherein, in Chemical Formula 18,
each of $R^{180}$ to $R^{189}$ is independently hydrogen, an alkyl group, an alkoxy group, an aryl group, a hydroxy group, or a carboxyl group.

5. The polymerizable composition according to claim 1, wherein, in Chemical Formula 9, n is 2 to 200.

6. The polymerizable composition according to claim 1, wherein the compound represented by Chemical Formula 9 has a decomposition temperature of 300° C. or more.

7. The polymerizable composition according to claim 1, wherein the filler comprises one or more particles selected from the group consisting of graphite, polytetrafluoroethylene, tungsten disulfide, and molybdenum disulfide.

8. The polymerizable composition according to claim 7, wherein the filler further comprises one or more particles selected from the group consisting of glass fiber, titanium oxide, antimony trisulfide, antimony trioxide, barium sulfate, calcium hydroxide, calcium carbonate, magnesium oxide, calcium fluoride, silica, alumina, iron oxide, chromium oxide, zirconium oxide, boron nitride, carbon nanotubes, carbon fiber, and graphene.

9. The polymerizable composition according to claim 7, wherein a coefficient of friction under a non-lubricant condition, measured for a thrust washer test specimen having a contact area of 1.3 cm$^2$ against a carbon steel friction subject material under a PV value of 2.3 MPa·m/s according to ASTM D3802, is 0.28 or less.

10. The polymerizable composition according to claim 1, wherein a coefficient of friction under a non-lubricant condition, measured for a thrust washer test specimen having a contact area of 1.3 cm$^2$ against an aluminum alloy friction subject material under a PV value of 2.3 MPa·m/s according to ASTM D3802, is 0.2 or less.

11. The polymerizable composition according to claim 1, wherein a process temperature is 150° C. to 350° C.

12. A prepolymer which is a reaction product of the polymerizable composition of claim 1.

13. A friction component material prepared using the low friction polymerizable composition of claim 1.

14. The friction component material according to claim 13, wherein the friction component material is a bearing, a bushing, a thrust washer, an oil seal, a piston ring, a sliding, or a roller.

* * * * *